US012630571B2

(12) United States Patent
Jiang et al.

(10) Patent No.: US 12,630,571 B2
(45) Date of Patent: May 19, 2026

(54) CRYSTAL FORM OF L-GLUFOSINATE AND PREPARATION METHOD AND USE THEREOF

(71) Applicant: JIANGSU SEVENCONTINENT GREEN TECHNOLOGY RESEARCH INSTITUTE CO., LTD, Suzhou (CN)

(72) Inventors: Yuhua Jiang, Suzhou (CN); Jing An, Suzhou (CN); Lei Ji, Suzhou (CN); Yingying Sheng, Suzhou (CN); Ji Chen, Suzhou (CN)

(73) Assignee: Jiangsu Sevencontinent Green Technology Research Institute Co., Ltd., Suzhou (CN)

( * ) Notice: Subject to any disclaimer, the term of this patent is extended or adjusted under 35 U.S.C. 154(b) by 760 days.

(21) Appl. No.: 17/938,884

(22) Filed: Oct. 7, 2022

(65) Prior Publication Data

US 2023/0399347 A1     Dec. 14, 2023

Related U.S. Application Data

(63) Continuation-in-part of application No. PCT/CN2022/098000, filed on Jun. 10, 2022.

(51) Int. Cl.
*C07F 9/02* (2006.01)
*C07F 9/30* (2006.01)

(52) U.S. Cl.
CPC .............. *C07F 9/025* (2013.01); *C07F 9/301* (2013.01); *C07B 2200/13* (2013.01)

(58) Field of Classification Search
None
See application file for complete search history.

(56) References Cited

U.S. PATENT DOCUMENTS

| | | | |
|---|---|---|---|
| 11,634,442 B2 | 4/2023 | Fields et al. | |
| 2024/0270768 A1* | 8/2024 | Mudaliar | C07F 9/301 |

FOREIGN PATENT DOCUMENTS

| CN | 108727427 A | * | 11/2018 | .............. C07F 9/301 |
|---|---|---|---|---|
| CN | 109369713 A | | 2/2019 | |
| CN | 110437276 A | | 11/2019 | |
| CN | 111065270 A | | 4/2020 | |
| CN | 113234767 A | | 8/2021 | |
| CN | 113461730 A | | 10/2021 | |

(Continued)

OTHER PUBLICATIONS

Machine translation of CN-108727427-A. (Year: 2025).*

(Continued)

*Primary Examiner* — Amy C Bonaparte
(74) *Attorney, Agent, or Firm* — Knobbe, Martens, Olson & Bear, LLP

(57) ABSTRACT

The present disclosure is directed to a crystal of L-glufosinate and a preparation method and use thereof. The crystal of L-glufosinate includes five crystal forms, namely crystal form A, crystal form B, crystal form C, crystal form D and crystal form E. These crystal forms show excellent effects in stability, hygroscopicity, storage, etc., which are beneficial to the preparation, separation and storage of herbicides, and at the same time have good solubility and good pharmacokinetics, which is further beneficial to improve the level and speed of herbicides to control weeds.

12 Claims, 11 Drawing Sheets

(56)  References Cited

FOREIGN PATENT DOCUMENTS

| CN | 113480573 A | 10/2021 |
| CN | 113831364 A | 12/2021 |
| WO | WO 2020/214631 A1 | 10/2020 |
| WO | WO-2022024052 A1 * | 2/2022 | .............. C07F 9/301 |

OTHER PUBLICATIONS

Du et al., "The Synthesis Process of Glufosinate-ammonium and Its Intermediate"; Agrochemicals, vol. 51, No. 5, pp. 331-340, May 2012.

Chinese Office Action issued for Chinese Patent Application No. 202110683801.2, dated Aug. 17, 2022 in 18 pages including English translation.

Paulus et al., Molecular and crystal structure of L-phosphinothricin (2-ammonio-4-methylphosphinico-butyrate), Zeitschrift für Kristallographie, vol. 160, pp. 63-68, 1982.

* cited by examiner

CRYSTAL FORM OF L-GLUFOSINATE AND PREPARATION METHOD AND USE THEREOF

CROSS-REFERENCE TO RELATED APPLICATIONS

This application is a Continuation-in-Part of PCT App. Serial No. PCT/CN2022/098000, having an International Filing Date of Jun. 10, 2022, and the entire disclosure is hereby incorporated by reference.

TECHNICAL FIELD

The present disclosure relates to crystal forms of L-glufosinate, and a preparation method and use thereof.

BACKGROUND

Glufosinate, a contact sterilant herbicide, has the characteristics of broad herbicidal spectrum, low toxicity, high activity and good environmental compatibility, and its active effect is slower than that of paraquat, but better than that of glyphosate; it has become a non-selective herbicide coexisting with glyphosate and paraquat, and has broad application prospects; many weeds are sensitive to glufosinate, so it can be used as an alternative to glyphosate in areas where glyphosate resistance has developed.

L-glufosinate ammonium, whose chemical name is 4-[hydroxy(methyl)phosphinyl]-L-homoalanine, is the active ingredient in racemic glufosinate-ammonium, and studies have shown that its herbicidal activity is twice that of the racemate.

The crystal structure of the active ingredients of herbicides often causes differences in their various physical and chemical properties, such as solubility, dissolution rate, storage stability, hardness, etc. These differences directly affect the preparation process, storage method, separation method, pharmacokinetic performance, etc. of the herbicides, which in turn affect the level, speed and difficulty of specific operations of herbicides to control weeds.

At present, the crystal forms of L-glufosinate ammonium salt have been partially studied, such as Chinese invention patents CN111065270, CN109369713, CN110437276A, CN113831364A, CN113480573A, etc., and the crystal forms involved mainly include ammonium salt form, zwitterionic form or mixed crystals of the two. For example, CN111065270 described that crystalline forms A to E of L-glufosinate are obtained by screening from glutamic acid composition, wherein form A is a metastable form and tends to convert to other forms, and ion chromatography showed that the ionic ammonium content was 6.4%, indicating that the crystalline form was a mixed crystal of ammonium salt structure and zwitterionic structure; form B is a crystalline form of L-glufosinate zwitterion, and form C is a metastable form and tends to convert to form A and form B; form D is prepared from several room temperature or elevated temperature slurries in polymorph screening, typically a mixture with form A, and both form B and form D are anhydrous crystalline forms of the free form of L-glufosinate; the $^1$H NMR spectrum of form E is consistent with L-glufosinate, but peak shifts suggest potential ionization differences, IC analysis showed only a small amount of ammonium and a stoichiometric amount of chloride, the result reveals that form E is not the form of L-glufosinate, but the form of L-glufosinate hydrochloride.

However, the above-mentioned crystalline forms of L-glufosinate still have one or more deficiencies in stability, hygroscopicity, etc. Therefore, it is of great significance to deeply study the polymorphism of herbicides and find the crystal forms with good properties.

SUMMARY

The problem to be solved by the present disclosure is to provide a new crystal form A of L-glufosinate, which is the ammonium salt form of L-glufosinate, and has excellent effects in terms of stability and hygroscopicity.

Meanwhile, the present disclosure further provides a new crystal form B of L-glufosinate, which is the ammonium salt form of L-glufosinate, and has excellent effects in terms of stability and hygroscopicity.

Meanwhile, the present disclosure further provides a new crystal form C of L-glufosinate, which is the zwitterionic form of L-glufosinate, and has excellent effects in terms of stability and hygroscopicity.

Meanwhile, the present disclosure further provides a new crystal form D of L-glufosinate, which is the ammonium salt form of L-glufosinate, and has both excellent thermal stability and herbicidal effect.

Meanwhile, the present disclosure further provides a new crystal form E of L-glufosinate, which is the ammonium salt form of L-glufosinate, and has both excellent thermal stability and herbicidal effect.

Meanwhile, the present disclosure further provides preparation methods of the above-mentioned crystals and their use in the preparation of herbicides.

To solve the above-mentioned problems, a technical solution adopted by the present disclosure is:

A crystal of L-glufosinate, the crystal is a crystal form A of L-glufosinate, which has an X-ray powder diffraction pattern with characteristic peaks at $2\theta$ of $16.658°\pm0.2°$, $18.139°\pm0.2°$, $23.960°\pm0.2°$, $25.458°\pm0.2°$, and $28.380°\pm0.2°$.

In some implementations of the present disclosure, the X-ray powder diffraction pattern of the crystal form A of L-glufosinate further has one or both characteristic peaks at $2\theta$ of $9.916°\pm0.2°$ and $28.879°\pm0.2°$.

According to a specific aspect of the present disclosure, the X-ray powder diffraction pattern of the crystal form A of L-glufosinate further has one or more characteristic peaks at $2\theta$ of $19.361°\pm0.2°$, $19.859°\pm0.2°$, $21.395°\pm0.2°$, and $21.708°\pm0.2°$.

According to a specific aspect of the present disclosure, the X-ray powder diffraction pattern of the crystal form A of L-glufosinate has characteristic peaks at $2\theta$ of $9.916°\pm0.2°$, $16.658°\pm0.2°$, $18.139°\pm0.2°$, $19.361°\pm0.2°$, $19.859°\pm0.2°$, $21.395°\pm0.2°$, $21.708°\pm0.2°$, $23.960°\pm0.2°$, $25.458°\pm0.2°$, $28.380°\pm0.2°$, and $28.879°\pm0.2°$.

According to a specific aspect of the present disclosure, the X-ray powder diffraction pattern of the crystal form A of L-glufosinate is as depicted in FIG. 1.

According to some specific aspects of the present disclosure, a spectrum of the crystal form A of L-glufosinate determined by differential scanning calorimetry shows one endothermic peak, and the peak temperature of the endothermic peak is $129.58\pm2°$ C.

According to a specific aspect of the present disclosure, the crystal form A of L-glufosinate is an anhydrous single ammonium salt crystal form of glufosinate.

According to a specific aspect of the present disclosure, a spectrum of the crystal form A of L-glufosinate determined by differential scanning calorimetry is as depicted in FIG. 2.

Meanwhile, the present disclosure further provides a crystal of L-glufosinate, the crystal is a crystal form B of L-glufosinate, which has an X-ray powder diffraction pattern with characteristic peaks at 2θ of 9.484°±0.2°, 12.163°±0.2°, 17.098°±0.2°, 22.540°±0.2°, and 34.899°±0.2°.

In some implementations of the present disclosure, the X-ray powder diffraction pattern of the crystal form B of L-glufosinate further has one or more characteristic peaks at 2θ of 10.833°±0.2°, 19.240°±0.2°, 21.481°±0.2°, 25.202°±0.2°, 32.418°±0.2°, and 34.022°±0.2°.

In some implementations of the present disclosure, the X-ray powder diffraction pattern of the crystal form B of L-glufosinate may further have one or more characteristic peaks at 2θ of 19.638°±0.2°, 24.879°±0.2°, 27.927°±0.2°, and 37.139°±0.2°.

According to a specific aspect of the present disclosure, the X-ray powder diffraction pattern of the crystal form B of L-glufosinate has characteristic peaks at 2θ of 9.484°±0.2°, 10.833°±0.2°, 12.163°±0.2°, 17.098°±0.2°, 19.240°±0.2°, 19.638°±0.2°, 21.481°±0.2°, 22.540°±0.2°, 24.879°±0.2°, 25.202°±0.2°, 27.927°±0.2°, 32.418°±0.2°, 34.022°±0.2°, 34.899°±0.2°, and 37.139°±0.2°.

According to a specific aspect of the present disclosure, the X-ray powder diffraction pattern of the crystal form B of L-glufosinate is as depicted in FIG. 3.

According to some specific aspects of the present disclosure, a spectrum of the crystal form B of L-glufosinate determined by differential scanning calorimetry shows one endothermic peak, and the peak temperature of the endothermic peak is 134.07±2° C.

According to a specific aspect of the present disclosure, a spectrum of the crystal form B of L-glufosinate determined by differential scanning calorimetry is as depicted in FIG. 4.

Meanwhile, the present disclosure further provides a crystal of L-glufosinate, the crystal is a crystal form C of L-glufosinate, which has an X-ray powder diffraction pattern with characteristic peaks at 2θ of 16.018°±0.2°, 19.067°±0.2°, 19.338°±0.2°, and 21.581°±0.2°.

In some implementations of the present disclosure, the X-ray powder diffraction pattern of the crystal form C of L-glufosinate further has one or more characteristic peaks at 2θ of 16.620°±0.2°, 17.460°±0.2°, 29.159°±0.2°, 34.477°±0.2°, and 35.280°±0.2°.

According to a specific aspect of the present disclosure, the X-ray powder diffraction pattern of the crystal form C of L-glufosinate may further have one or more characteristic peaks at 2θ of 9.802°±0.2°, 18.139°±0.2°, 19.834°±0.2°, 21.984°±0.2°, 23.723°±0.2°, 25.439°±0.2°, 25.738°±0.2°, 26.758°±0.2°, 27.082°±0.2°, 28.395°±0.2°, 30.983°±0.2°, 32.584°±0.2°, 33.100°±0.2°, 34.242°±0.2°, 36.768°±0.2°, 37.075°±0.2°, and 39.535°±0.2°.

In a specific aspect of the present disclosure, the X-ray powder diffraction pattern of the crystal form C of L-glufosinate has characteristic peaks at 2θ of 9.802°±0.2°, 16.018°±0.2°, 16.620°±0.2°, 17.460°±0.2°, 18.139°±0.2°, 19.067°±0.2°, 19.338°±0.2°, 19.834°±0.2°, 20.600°±0.2°, 21.581°±0.2°, 21.984°±0.2°, 23.723°±0.2°, 25.439°±0.2°, 25.738°±0.2°, 26.758°±0.2°, 27.082°±0.2°, 28.395°±0.2°, 29.159°±0.2°, 30.983°±0.2°, 32.584°±0.2°, 33.100°±0.2°, 34.242°±0.2°, 34.477°±0.2°, 35.280°±0.2°, 36.768°±0.2°, 37.075°±0.2°, and 39.535°±0.2°.

According to a specific aspect of the present disclosure, the X-ray powder diffraction pattern of the crystal form C of L-glufosinate is as depicted in FIG. 5.

According to some specific aspects of the present disclosure, a spectrum of the crystal form C of L-glufosinate determined by differential scanning calorimetry shows one endothermic peak, and the peak temperature of the endothermic peak is 139.14±2° C.

According to a specific aspect of the present disclosure, a spectrum of the crystal form C of L-glufosinate determined by differential scanning calorimetry is as depicted in FIG. 6.

Meanwhile, the present disclosure further provides a crystal of L-glufosinate ammonium, the crystal is a crystal form D of L-glufosinate ammonium, which has an X-ray powder diffraction pattern with characteristic peaks at 2θ of 8.583°±0.2°, 17.202°±0.2°, 18.398°±0.2°, and 23.001°±0.2°.

Further, the X-ray powder diffraction pattern of the crystal form D of L-glufosinate ammonium further has one or more characteristic peaks at 2θ of 17.738°±0.2°, 21.977°±0.2°, 22.721°±0.2°, and 25.716°±0.2°.

Further, the X-ray powder diffraction pattern of the crystal form D of L-glufosinate ammonium further has one or more characteristic peaks at 2θ of 32.980°±0.2°, 35.920°±0.2°, and 39.509°±0.2°.

According to some specific aspects of the present disclosure, the X-ray powder diffraction pattern of the crystal form D of L-glufosinate ammonium has characteristic peaks at 2θ of 8.583°±0.2°, 17.202°±0.2°, 17.738°±0.2°, 18.398°±0.2°, 21.977°±0.2°, 22.721°±0.2°, 23.001°±0.2°, 25.716°±0.2°, 32.980°±0.2°, 35.920°±0.2°, and 39.509°±0.2°.

According to a specific aspect of the present disclosure, the X-ray powder diffraction pattern of the crystal form D of L-glufosinate ammonium is as depicted in FIG. 7.

According to some preferred aspects of the present disclosure, a spectrum of the crystal form D of L-glufosinate ammonium determined by differential scanning calorimetry shows two endothermic peaks, onset temperatures of the two endothermic peaks are 161.84±2° C. and 199.46±2° C., respectively, and peak temperatures of the two endothermic peaks are 179.83±2° C. and 218.80±2° C., respectively.

According to some preferred aspects of the present disclosure, a spectrum of the crystal form D of L-glufosinate ammonium determined by thermogravimetric analysis shows that a weight loss of 4.3±0.2% occurs when heated from 139.5±2° C. to 206.5±2° C.

According to a specific aspect of the present disclosure, a spectrum of the crystal form D of L-glufosinate ammonium determined by differential scanning calorimetry is as depicted in FIG. 8, and a combined spectrum thereof determined by differential scanning calorimetry and thermogravimetric analysis is as depicted in FIG. 9.

According to the present disclosure, the crystal form D of L-glufosinate ammonium is an anhydrous form.

Meanwhile, the present disclosure further provides a crystal of L-glufosinate ammonium, the crystal is a crystal form E of L-glufosinate ammonium, which has an X-ray powder diffraction pattern with characteristic peaks at 2θ of 8.884°±0.2°, 16.603°±0.2°, 17.459°±0.2°, 18.101°±0.2°, 18.658°±0.2°, and 23.224°±0.2°.

Further, the X-ray powder diffraction pattern of the crystal form E of L-glufosinate ammonium further has one or both characteristic peaks at 2θ of 19.513°±0.2°, and 33.221°±0.2°.

According to some specific aspects of the present disclosure, the X-ray powder diffraction pattern of the crystal form E of L-glufosinate ammonium has characteristic peaks at 2θ of 8.884°±0.2°, 16.603°±0.2°, 17.459°±0.2°, 18.101°±0.2°, 18.658°±0.2°, 19.513°±0.2°, 23.224°±0.2°, and 33.221°±0.2°.

According to a specific aspect of the present disclosure, the X-ray powder diffraction pattern of the crystal form E of L-glufosinate ammonium is as depicted in FIG. 10.

According to some preferred aspects of the present disclosure, a spectrum of the crystal form E of L-glufosinate ammonium determined by differential scanning calorimetry shows three endothermic peaks, onset temperatures of the three endothermic peaks are 95.5±2° C., 147±2° C., and 201±2° C., respectively, and peak temperatures of the three endothermic peaks are 113±2° C., 185.8±2° C., and 226.5±2° C., respectively.

According to some preferred aspects of the present disclosure, a spectrum of the crystal form E of L-glufosinate ammonium determined by thermogravimetric analysis shows that a weight loss of 1.2±0.2% occurs when heated from 95.5±2° C. to 147±2° C., and a weight loss of 2.89±0.2% occurs when heated from 147±2° C. to 201±2° C.

According to a specific aspect of the present disclosure, a combined spectrum of the crystal form E of L-glufosinate ammonium determined by differential scanning calorimetry and thermogravimetric analysis is as depicted in FIG. 11.

According to the present disclosure, the crystal form E of L-glufosinate ammonium is an anhydrous form.

The present disclosure further provides a technical solution: the present disclosure provides a preparation method of the crystal form A of L-glufosinate mentioned above, which comprises:

dispersing L-glufosinate hydrochloride in water to form a dispersion liquid, neutralizing with ammonia gas and controlling the pH of the dispersion liquid to 6-8, concentrating, adding an organic solvent at a temperature T1, and cooling down to −10 to 15° C. at a cooling rate of Tj−Tr=−1 to −5K between the external temperature (Tj) and the internal temperature (Tr), holding the temperature, precipitating solid, filtering to obtain the solid, drying the obtained solid, mixing the dried solid with an organic solvent and refluxing, and cooling down to −10 to 15° C. at a cooling rate of Tj−Tr=−1 to −5K between the external temperature (Tj) and the internal temperature (Tr), holding the temperature, precipitating solid, filtering to obtain the solid, and drying the obtained solid to give the crystal form A of L-glufosinate, wherein the T1 is between 50° C. and the boiling point of the organic solvent; or, dispersing L-glufosinate hydrochloride in water to form a dispersion liquid, neutralizing with ammonia gas and controlling the pH of the dispersion liquid to 6-8, concentrating, controlling the temperature at 20-40° C., adding an organic solvent at a dropping rate of 0.1-10 g/min with precipitation of solid during the dropping process, holding the temperature, and cooling to −10 to 15° C., holding the temperature, precipitating solid, filtering to obtain the solid, drying the obtained solid, mixing the dried solid with an organic solvent and refluxing, and cooling down to −10 to 15° C. at a cooling rate of Tj−Tr=−1 to −5K between the external temperature (Tj) and the internal temperature (Tr), holding the temperature, precipitating solid, filtering to obtain the solid, and drying the obtained solid to give the crystal form A of L-glufosinate.

Meanwhile, the present disclosure further provides a preparation method of the crystal form B of L-glufosinate mentioned above, which comprises:

dispersing L-glufosinate hydrochloride in water to form a dispersion liquid, neutralizing with ammonia gas and controlling the pH of the dispersion liquid to 6-8, concentrating, adding an organic solvent at a temperature T2, and cooling down to −10 to 15° C. at a cooling rate of Tj−Tr=−1 to −5K between the external temperature (Tj) and the internal temperature (Tr), holding the temperature, precipitating solid, filtering to obtain the solid, drying the obtained solid to give the crystal form B of L-glufosinate, wherein the T2 is between 50° C. and the boiling point of the organic solvent.

Meanwhile, the present disclosure further provides a preparation method of the crystal form C of L-glufosinate mentioned above, which comprises:

dispersing L-glufosinate hydrochloride in water to form a dispersion liquid, neutralizing with ammonia gas and controlling the pH of the dispersion liquid to 1-4, concentrating, adding an organic solvent at a temperature T3, and cooling down to −10 to 15° C. at a cooling rate of Tj−Tr=−1 to −5K between the external temperature (Tj) and the internal temperature (Tr), holding the temperature, precipitating solid, filtering to obtain the solid, drying the obtained solid to give the crystal form C of L-glufosinate, wherein the T3 is between 50° C. and the boiling point of the organic solvent.

According to some preferred aspects of the present disclosure, the organic solvent is selected from a group consisting of an alcohol solvent, a ketone solvent, a nitrile solvent, and combinations thereof.

Further, the alcohol solvent is selected from a group consisting of methanol, ethanol, isopropanol, and combinations thereof.

Further, the ketone solvent includes acetone.

Further, the nitrile solvent includes acetonitrile.

According to some preferred aspects of the present disclosure, in the process of preparing the crystal form A, crystal form B or crystal form C of L-glufosinate, in the concentration step after introducing ammonia gas, the dispersion liquid is preferably concentrated to 30-80%.

According to some preferred aspects of the present disclosure, in the process of preparing the crystal form A, crystal form B or crystal form C of L-glufosinate, the feeding mass ratio of L-glufosinate hydrochloride to the organic solvent is 1:(1-20).

According to some preferred aspects of the present disclosure, in the process of preparing the crystal form A, crystal form B or crystal form C of L-glufosinate, the feeding mass ratio of water to the organic solvent is 1:(1-15).

According to some preferred aspects of the present disclosure, in one method of preparing the crystal form A of L-glufosinate, the dropping rate of the organic solvent is 1-5 g/min.

The present disclosure further provides a technical solution: a preparation method of the crystal form D of L-glufosinate ammonium, which comprises: adding L-glufosinate ammonium to an organic solvent, heating to 65-90° C. and holding the temperature for the first time, then cooling down to −10 to 35° C. at a cooling rate of Tj−Tr=−1 to −5K between the external temperature (Tj) and the internal temperature (Tr), holding the temperature for the second time, precipitating solid, filtering to obtain the solid, and drying the obtained solid to give the crystal form D of L-glufosinate ammonium.

The present disclosure further provides a technical solution: a preparation method of the crystal form E of L-glufosinate ammonium mentioned above, which comprises: adding L-glufosinate ammonium to a mixed solvent of an organic solvent and water, heating to 65-90° C. and holding the temperature for the first time, cooling down to 40 to 60° C. at a cooling rate of 1 to 5K between the external temperature and the internal temperature, holding the temperature for the second time, then cooling down to −10 to 35° C. at a cooling rate of 1 to 5K between the external temperature and the internal temperature, holding the temperature for the third time, precipitating solid, filtering to obtain the solid, and drying the obtained solid to give the crystal form E of L-glufosinate ammonium.

In some preferred implementations of the present disclosure, in the process of preparing the crystal forms D and E of L-glufosinate ammonium, the purity of L-glufosinate ammonium is greater than or equal to 85%, and further greater than or equal to 92%.

According to the present disclosure, in the process of preparing the crystal forms D and E of L-glufosinate ammonium, L-glufosinate ammonium includes amorphous or other ammonium salt forms disclosed in the prior art.

According to some preferred aspects of the present disclosure, in the process of preparing the crystal forms D and E of L-glufosinate ammonium, the organic solvent is selected from a group consisting of an alcohol solvent, a ketone solvent, a nitrile solvent, and combinations thereof.

Further, the alcohol solvent is selected from a group consisting of methanol, ethanol, isopropanol, and combinations thereof.

Further, the ketone solvent includes acetone.

Further, the nitrile solvent includes acetonitrile.

According to a specific aspect of the present disclosure, the organic solvent is methanol.

According to some preferred aspects of the present disclosure, in the process of preparing the crystal forms D and E of L-glufosinate ammonium, the feeding mass ratio of L-glufosinate ammonium to the organic solvent is 1:(1-20). Further, the feeding mass ratio of L-glufosinate ammonium to the organic solvent is 1:(1-10).

According to some preferred aspects of the present disclosure, in the process of preparing the crystal forms E of L-glufosinate ammonium, the feeding mass ratio of water to the organic solvent is (0.05-0.3):1.

According to some preferred aspects of the present disclosure, in the process of preparing the crystal form D of L-glufosinate ammonium, the holding temperature of the first time of temperature holding is 65-80° C., and the holding time of the first time of temperature holding is 1-15 h; further, the holding time of the first time of temperature holding is 6-15 h; according to a specific aspect of the present disclosure, the holding temperature of the first time of temperature holding is 65-75° C., and the holding time of the first time of temperature holding is 8-13 h.

According to some preferred aspects of the present disclosure, in the process of preparing the crystal form D of L-glufosinate ammonium, the holding temperature of the second time of temperature holding is 15-35° C., and the holding time of the second time of temperature holding is 1 h-7 days; further, the holding time of the second time of temperature holding is 10-36 h; according to a specific aspect of the present disclosure, the holding temperature of the second time of temperature holding is 25-35° C., and the holding time of the second time of temperature holding is 20-30 h.

According to some preferred aspects of the present disclosure, in the process of preparing the crystal form E of L-glufosinate ammonium, the holding temperature of the first time of temperature holding is 65-80° C., and the holding time of the first time of temperature holding is 1-15 h; further, the holding time of the first time of temperature holding is 6-15 h; according to a specific aspect of the present disclosure, the holding temperature of the first time of temperature holding is 65-75° C., and the holding time of the first time of temperature holding is 8-13 h.

According to some preferred aspects of the present disclosure, in the process of preparing the crystal form E of L-glufosinate ammonium, the holding temperature of the second time of temperature holding is 45-55° C., and the holding time of the second time of temperature holding is 0.1-3 h. Further, the holding time of the second time of temperature holding is 0.5-2 h. According to a specific aspect of the present disclosure, the holding temperature of the second time of temperature holding is 48-52° C., and the holding time of the second time of temperature holding is 0.8-1.5 h.

According to some preferred aspects of the present disclosure, in the process of preparing the crystal form E of L-glufosinate ammonium, the holding temperature of the third time of temperature holding is 10-30° C., and the holding time of the third time of temperature holding is 1 h-7 days; further, the holding time of the third time of temperature holding is 10-36 h; according to a specific aspect of the present disclosure, the holding temperature of the third time of temperature holding is 20-30° C., and the holding time of the third time of temperature holding is 20-30 h.

The present disclosure further provides a technical solution: a herbicide composition comprising an active ingredient and a carrier, the active ingredient comprising the aforementioned crystals.

Meanwhile, the present disclosure further provides use of the above-mentioned crystals in the preparation of herbicides.

In order to help understand the various embodiments disclosed in the present application, the following descriptions are provided:

The X-ray powder diffraction pattern is characteristic for a specific crystal form. When judging whether it is the same as the known crystal form, it should be noted the relative positions of the peaks (i.e., $2\theta$) rather than their relative intensities. This is because the relative intensity of the pattern will change due to the dominant orientation effect caused by the difference in crystal conditions, particle size and other determination conditions, especially the low-intensity peak (intensity less than 20%) may not exist in some cases, the relative intensity of the diffraction peak is not characteristic for the determination of the crystal form, in fact, the relative intensity of the diffraction peak in the XRPD pattern is related to the preferred orientation of the crystal, the peak intensity shown herein is illustrative and not for absolute comparison. In addition, it is known in the art that when X-ray diffraction is used to determine the crystal of a compound, due to the influence of the measuring instrument or measuring conditions, the $2\theta$ value of the same crystal form may have a certain measurement error, about ±0.2°. Therefore, this error should be taken into consideration when determining each crystal structure. In the XRD pattern, the peak position is usually expressed by the $2\theta$ angle or the interplanar distance d value, and there is a simple conversion relationship between the two: $d=\lambda/2 \sin \theta$, where d represents the interplanar spacing d value, and $\lambda$ represents the wavelength of incident X-rays, $\theta$ is the diffraction angle. It should also be pointed out that in the identification of the mixture, some diffraction lines will be missing due to factors such as decreased content. In addition, due to the influence of experimental factors such as sample purity, the overall peak angle will be shifted, and a certain shift is usually allowed. Therefore, those skilled in the art can understand that the X-ray diffraction pattern of the crystal form referred to in the present application does not have to be exactly the same as the X-ray diffraction pattern in the example referred to here, and the "XRPD pattern is the same" as used herein does not mean absolutely the same, the same peak position can differ by ±0.2° (or greater error) and the peak intensity allows a certain variability. Any crystal form that has the same or similar pattern to the characteristic peaks in these patterns falls within the scope of the present application. Those skilled in the art can compare the patterns listed in the present application with the patterns of an unknown crystal form to confirm whether the two sets of patterns reflect the same or different crystal forms.

On the basis of specific X-ray crystal diffraction patterns, those skilled in the art are usually allowed to select several characteristic peaks to define the crystal form, and the selection of characteristic peaks can be comprehensively considered based on a certain purpose, and there is no strict limit, for example, those skilled in the art prefer to select peaks with relatively high intensity, peaks with relatively low-angle, and characteristic peaks with a relatively complete peak shape, and select characteristic peaks that are sufficiently distinguishable from other crystals, so that the characteristic peaks can be distinguished, identified and determined. Therefore, it cannot be concluded that a different crystal form is formed or it exceeds the crystal form range of the existing application just because the combination of the selected characteristic peaks is changed.

DSC measures the transition temperature when a crystal absorbs or releases heat due to a change in its crystal structure or melting of the crystal. For the same crystal form of the same compound, in continuous analysis, the error of thermal transition temperature and melting point is typically within about 5° C. When we say that a compound has a given DSC peak or melting point, this means that the DSC peak or melting point is ±5° C. It should be pointed out that for a mixture, its DSC peak or melting point may vary in a larger range. In addition, due to the decomposition of the substance in the process of melting, the melting temperature is related to the heating rate.

It should be noted that the numerical values and numerical ranges mentioned in the present application should not be construed narrowly as numerical values or numerical ranges themselves, those skilled in the art should understand that they can fluctuate around specific values based on different specific technical environments without departing from the spirit and principles of the present application.

Due to the implementation of the above technical solutions, the present application has the following advantages over the prior art:

The present disclosure provides new crystal forms of L-glufosinate, specifically ammonium salt forms A, B, D and E and zwitterion form C of L-glufosinate, these crystal forms show excellent effects in at least one of stability, hygroscopicity, storage, etc., which are beneficial to the preparation, separation and storage of herbicides, and at the same time have good solubility and good pharmacokinetics, which is further beneficial to improve the level and speed of herbicides to control weeds.

Wherein, on the basis of low hygroscopicity, the crystal forms D and E not only have excellent high temperature stability (the weight will change slowly at about 140° C. or even above 145° C., and the weight will remain basically unchanged before that), but also have good herbicidal effects, with plant control effects on weeds such as Rumex, Alopecurus aequalis, Euphorbia helioscopia, and bluegrass all over 85%.

10

DETAILED DESCRIPTION OF EXEMPLARY EMBODIMENTS

Figure 1:
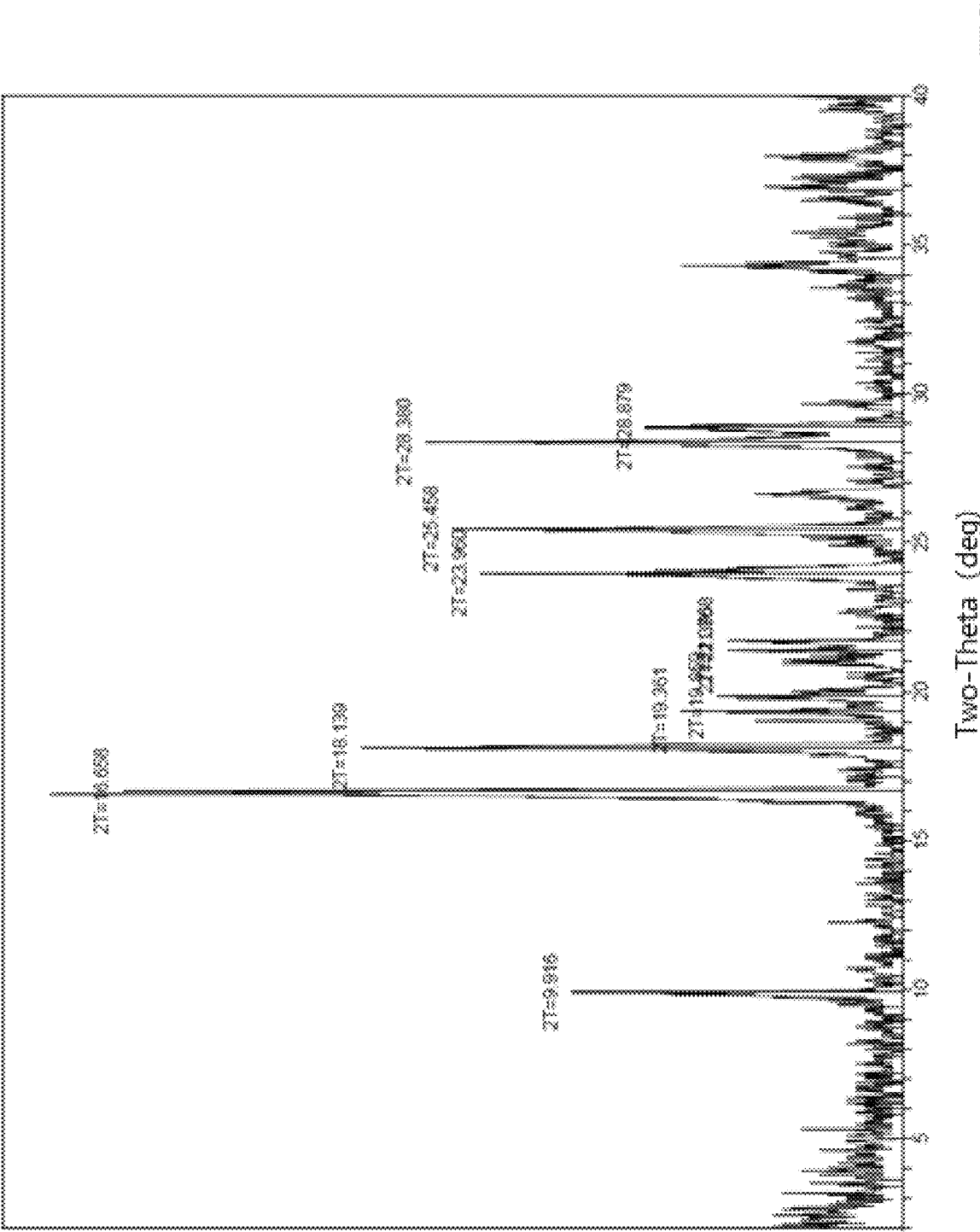
FIG. 1 shows the XRPD pattern of the crystal form A of L-glufosinate prepared in Embodiment 1.

In the following, the specific embodiments are combined to further explain the above solutions in detail; it should be understood that, those embodiments are to explain the basic principle, major features and advantages of the present disclosure, and the present disclosure is not limited by the scope of the following embodiments; the implementation conditions employed by the embodiments may be further adjusted according to particular requirements, and undefined implementation conditions usually are conditions in conventional experiments.

In the following embodiments, unless otherwise specified, all raw materials are basically commercially available or prepared by conventional methods in the field.

In the present application, the test instruments and conditions used in the experiment are as follows:

1. The crystal form of the product was analyzed by X-ray powder diffractometer (XRD, Rigaku D/Max-2500 type, Cu Kα radiation, λKα=0.15406 nm), the emission voltage and current were 40 kV and 100 mA, respectively, and the scanning range was 2-40°, the scan step size was 0.02°, and the scan rate was 8°/min.

2. Differential Scanning calorimetry (DSC) and Thermogravimetric Analysis (TGA): DSC and TGA analyses were performed using a TGA/DSC Model 1 instrument from Mettler Toledo. The DSC measurement method was as follows: take 5-10 mg of the sample into an aluminum crucible, put it into the instrument, set the nitrogen flow rate to 50 ml/min, 200 ml/min, and increase the temperature from 30° C. to 200° C. at a rate of 10° C./min, and analysis was performed using STAR software from Mettler Toledo. The TGA measurement method was as follows: take 5-10 mg of the sample into an aluminum crucible, put it into the instrument, set the nitrogen flow rate to 20 ml/min, 50 ml/min, and increase the temperature from 30° C. to 200° C. at a rate of 10° C./min, and analysis was performed using STAR software from Mettler Toledo.

In the following, Tj–Tr refers to the "difference between the external temperature and the internal temperature", wherein the external temperature is equivalent to the temperature of the cooling source (endothermic cooling part), the internal temperature refers to the temperature of the mixed solution, and the cooling rate Tj–Tr=–1 K to –5 K means that the difference between the external temperature and the internal temperature always maintains 1-5° C. during the cooling process, that is, the external temperature and the internal temperature both keep dynamic changes and always maintain a difference of 1-5° C.

Embodiment 1: Preparation of Crystal Form A of L-Glufosinate

Method 1: L-glufosinate hydrochloride (100 g, 0.46 mol) was added to water (200 g), ammonia gas was introduced to adjust the pH=7, the solution was concentrated under reduced pressure to 75%, methanol (600 g) was added at 60° C., and the solution was cooled down to 5° C. at a cooling rate of Tj–Tr=–2 K, the temperature was held for 24 h, solid was separated out, filtered, and dried, then methanol (300 g) was added to reflux for 24 h, and the solution was cooled down to 5° C. at a cooling rate of Tj–Tr=–2 K, and solid was separated out, filtered, and dried to give the crystal form A of L-glufosinate, with HPLC purity 99%.

Method 2: L-glufosinate hydrochloride (100 g, 0.46 mol) was added to water (200 g), ammonia gas was introduced to adjust the pH=7, the solution was concentrated under reduced pressure to 50% and cooled down to 30° C., methanol (600 g) was added dropwise at this temperature at a dropping rate of 2 g/min with slow precipitation of solid during the dropping process, after the dropwise addition, the temperature was held for 6 h, then cooled down to 5° C., and the temperature was held for 24 h, the solution was filtered and dried, then methanol (300 g) was added to reflux for 12 h, and the solution was cooled at a cooling rate with a difference of 2K between the external temperature and the internal temperature, and cooled down to 5° C., and kept the temperature to precipitate solid, filtered and dried to the solid to give the crystal form A of L-glufosinate.

XRPD test was performed on the solid obtained in Method 1, and the pattern was shown in FIG. 1, there were characteristic peaks at diffraction angles 2θ=16.658°, 18.139°, 23.960°, 25.458°, and 28.380°, and the 2θ error range was ±0.2 degrees. Its x-ray powder diffraction data were shown in Table 1.

TABLE 1

| XRPD pattern details of the crystal form A of L-glufosinate | | | | | |
|---|---|---|---|---|---|
| Position [2θ (°)] | d spacing [Å] | BG | Relative intensity [%] | Relative area [%] | FWHM |
| 9.916 | 8.913 | 2 | 41.5 | 20.8 | 0.107 |
| 16.658 | 5.317 | 3 | 100 | 100 | 0.214 |
| 18.139 | 4.8865 | 3 | 68.3 | 45.8 | 0.143 |
| 19.361 | 4.5807 | 2 | 26.8 | 19.1 | 0.152 |
| 19.859 | 4.4670 | 1 | 23.2 | 28.2 | 0.260 |
| 21.395 | 4.1498 | 2 | 20.7 | 31.7 | 0.327 |
| 21.708 | 4.0906 | 2 | 20.7 | 12.4 | 0.128 |
| 23.960 | 3.7109 | 2 | 53.7 | 45.2 | 0.180 |
| 25.458 | 3.4959 | 2 | 57.3 | 48.3 | 0.180 |
| 28.380 | 3.1422 | 2 | 61.0 | 61.0 | 0.214 |
| 28.879 | 3.0890 | 2 | 31.7 | 40.4 | 0.273 |

Figure 2:
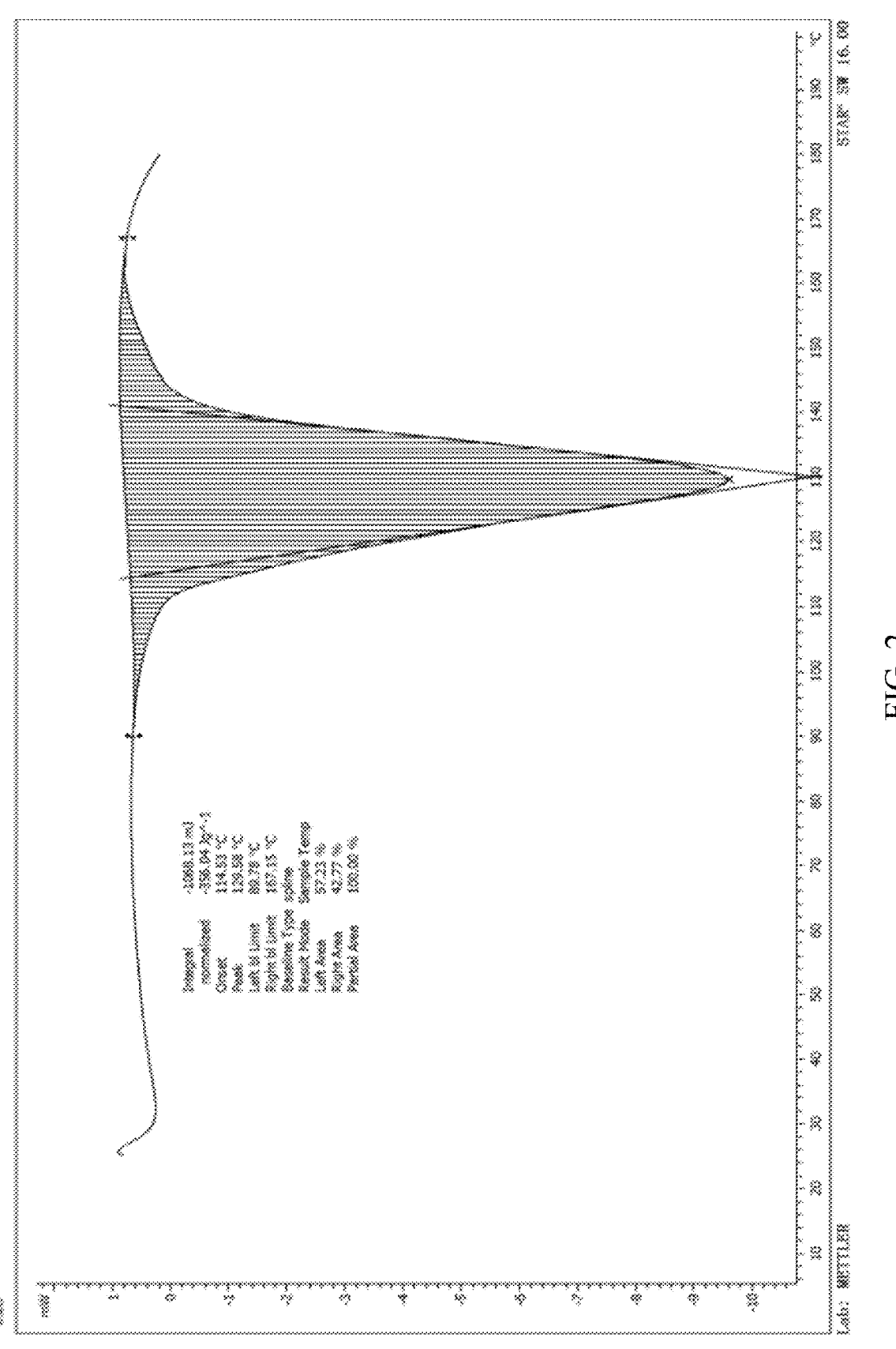
FIG. 2 shows the DSC spectrum of the crystal form A of L-glufosinate prepared in Embodiment 1.

The DSC results (FIG. 2) showed that there was an absorption peak at 129.58° C. (peak temperature); at the same time, based on the standard sample without crystal water, the quantitative content was 99%, and the ammonium content by ion chromatography was 9.0%, which is basically the same as expected from the theoretical monoammonium salt (9.1%), indicating that the crystal form is an anhydrous ammonium salt crystal of glufosinate.

XRPD test was performed on the solid obtained by Method 2, and the test pattern was substantially the same as depicted in FIG. 1, indicating that the obtained solids are the crystal form A of L-glufosinate.

Embodiment 2: Preparation of Crystal Form B of L-Glufosinate

L-glufosinate hydrochloride (100 g, 0.46 mol) was added to water (200 g), ammonia gas was introduced to adjust the pH=7, the solution was concentrated under reduced pressure to 50%, methanol (600 g) was added at 60° C., and the solution was cooled down to 5° C. at a cooling rate of Tj–Tr=–2 K, the temperature was held for 5 days, and solid was separated out, filtered, and dried to give the crystal form B of L-glufosinate.

Figure 3:
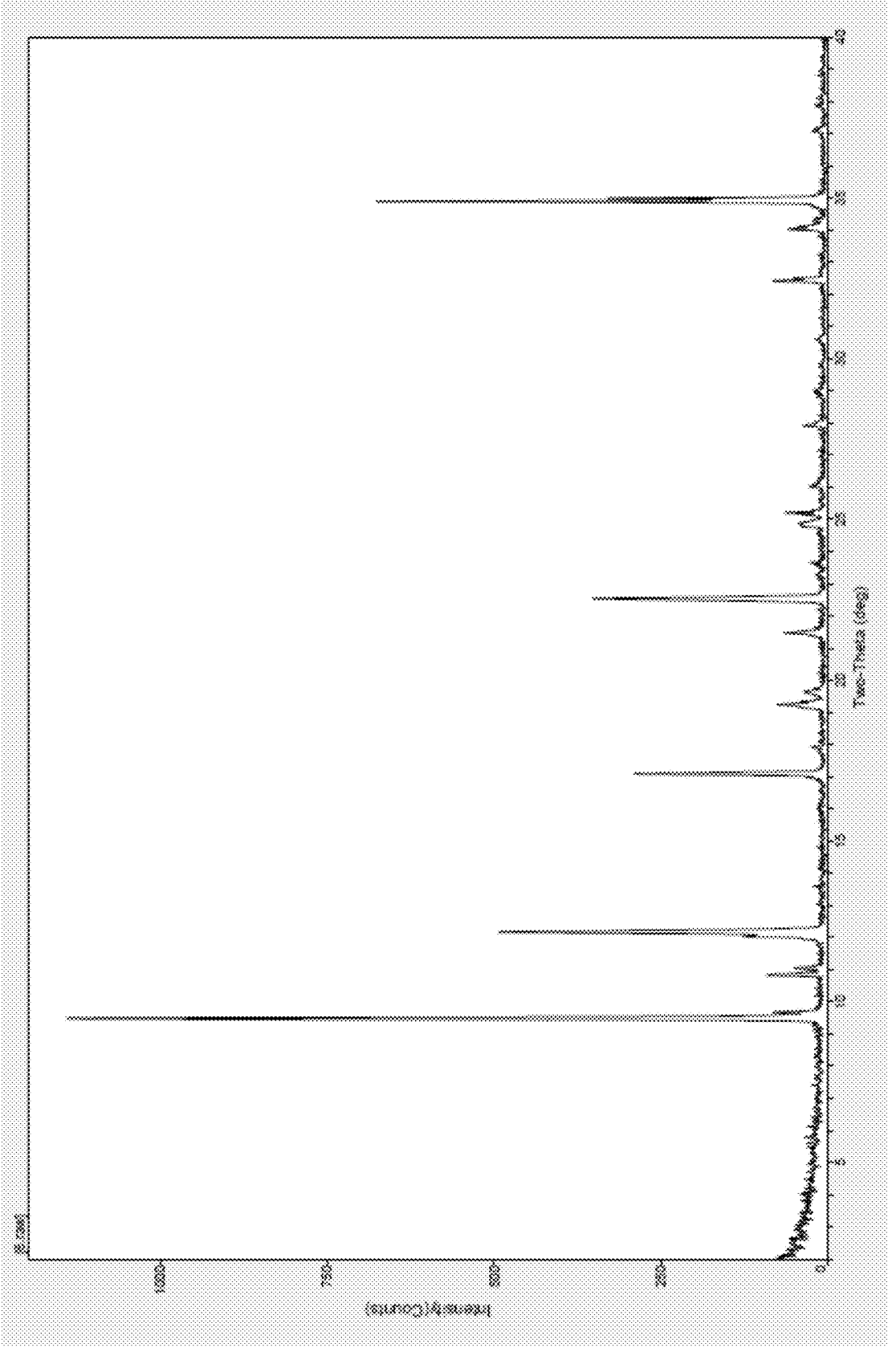
FIG. 3 shows the XRPD pattern of the crystal form B of L-glufosinate prepared in Embodiment 2.

XRPD test was performed on the obtained solid, and the pattern was shown in FIG. 3, there were characteristic peaks at diffraction angles 2θ=9.484°, 12.163°, 17.098°, 22.540°, and 34.899°, and the 2θ error range is ±0.2 degrees. Its x-ray powder diffraction data were shown in Table 2.

TABLE 2

| XRPD pattern details of the crystal form B of L-glufosinate | | | | | |
|---|---|---|---|---|---|
| Position [2θ (°)] | d spacing [Å] | BG | Relative intensity [%] | Relative area [%] | FWHM |
| 9.484 | 9.3179 | 11 | 100 | 100 | 0.077 |
| 10.833 | 8.1600 | 12 | 6.8 | 6.6 | 0.074 |
| 12.163 | 7.2706 | 8 | 42.9 | 63.0 | 0.113 |
| 17.098 | 5.1815 | 7 | 24.9 | 27.4 | 0.085 |
| 19.24 | 4.6093 | 7 | 6.0 | 11.2 | 0.142 |
| 19.638 | 4.5169 | 6 | 2.5 | 5.3 | 0.163 |
| 21.481 | 4.1332 | 6 | 5.1 | 8.7 | 0.130 |
| 22.54 | 3.9415 | 8 | 30.4 | 39.9 | 0.101 |
| 24.879 | 3.5759 | 7 | 3.1 | 9.3 | 0.231 |
| 25.202 | 3.5308 | 7 | 4.9 | 6.5 | 0.103 |
| 27.929 | 3.1919 | 6 | 2.6 | 3.1 | 0.093 |
| 32.418 | 2.7594 | 5 | 6.7 | 9.0 | 0.102 |
| 34.022 | 2.6329 | 6 | 4.6 | 7.9 | 0.132 |
| 34.899 | 2.5688 | 7 | 59.2 | 51.8 | 0.067 |
| 37.139 | 2.4188 | 4 | 1.4 | 4.3 | 0.232 |

Figure 4:
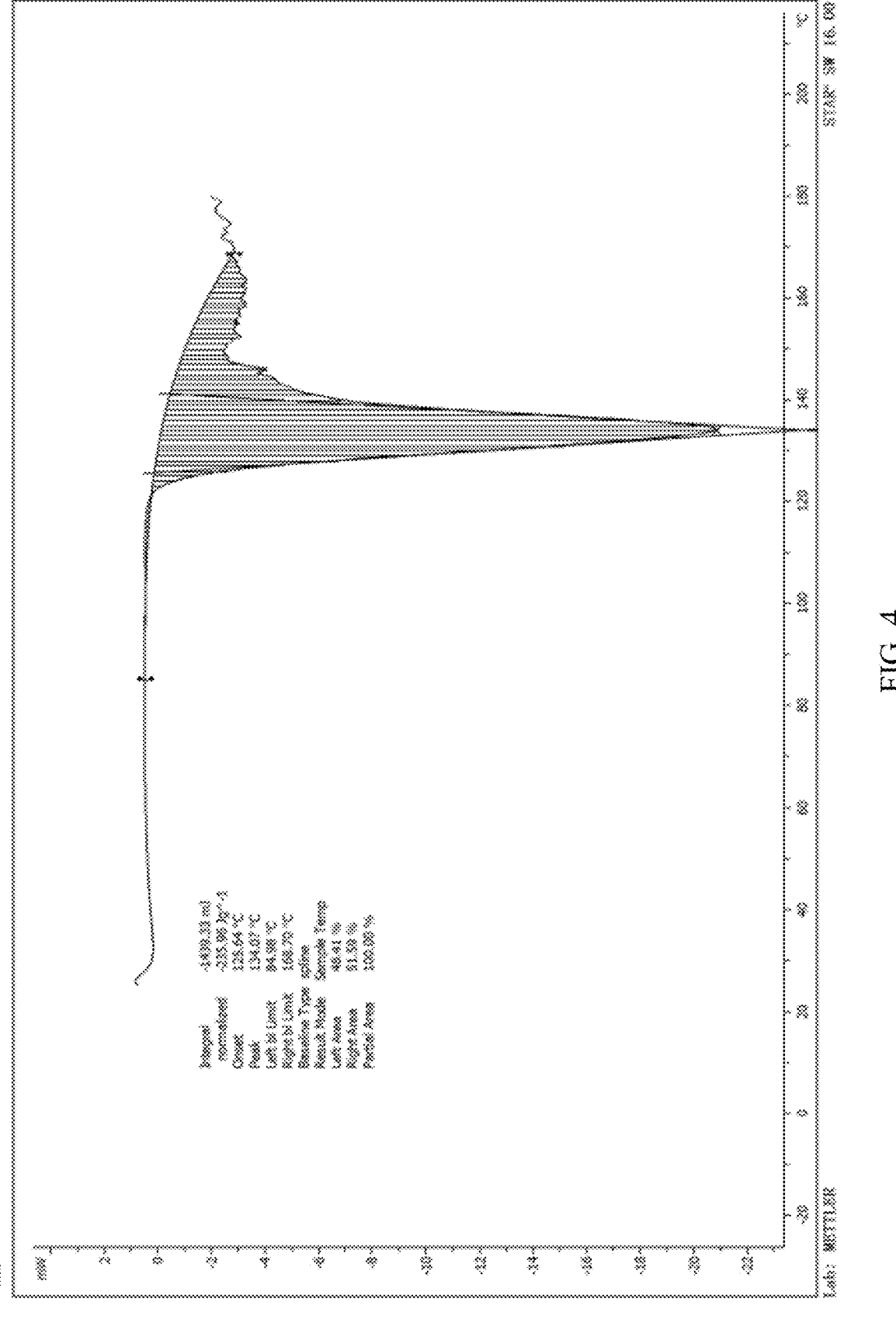
FIG. 4 shows the DSC spectrum of the crystal form B of L-glufosinate prepared in Embodiment 2.

The DSC results (FIG. 4) showed that there was an absorption peak at 134.07° C. (peak temperature); at the same time, based on the standard sample with crystal water, the quantitative content was 92%, and the ammonium content by ion chromatography was 8.4%, which is basically the same as expected from the theoretical monoammonium salt (8.4%), indicating that the crystal form is a crystal of ammonium salt monohydrate.

Embodiment 3: Preparation of Crystal Form C of L-Glufosinate

L-glufosinate hydrochloride (100 g, 0.46 mol) was added to water (200 g), ammonia gas was introduced to adjust the pH=2.5, the solution was concentrated under reduced pressure to 50%, methanol (300 g) was added at 60° C., and the solution was cooled down to 5° C. at a cooling rate of Tj–Tr=–1K, the temperature was held for 24 h, and solid was separated out, filtered, and dried to give the crystal form C of L-glufosinate.

Figure 5:
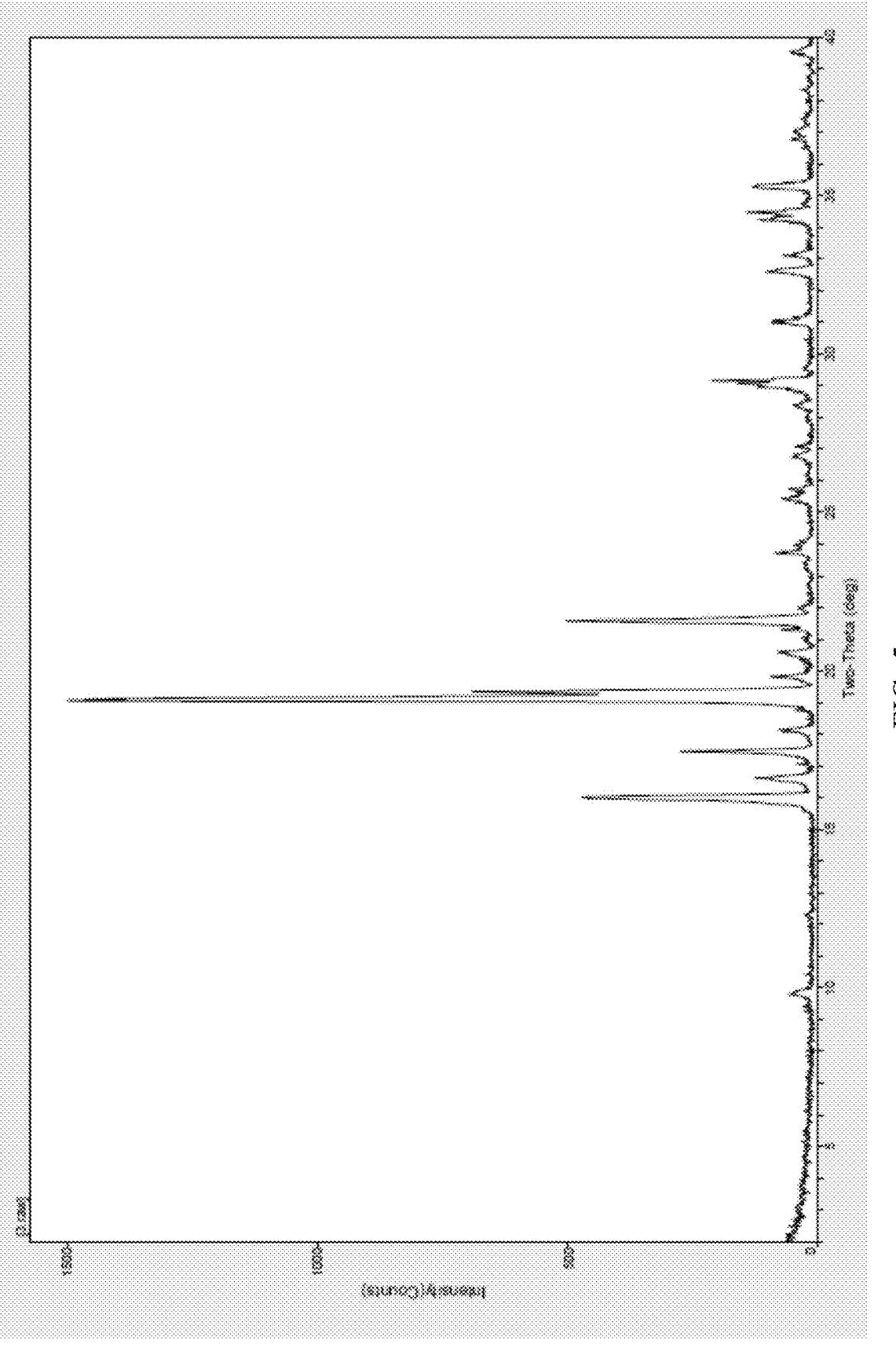
FIG. 5 shows the XRPD pattern of the crystal form C of L-glufosinate prepared in Embodiment 3.

XRPD test was performed on the obtained solid, and the pattern was shown in FIG. 5, there were characteristic peaks at diffraction angles $2\theta=16.018°$, $19.067°$, $19.338°$, and $21.581°$, and the $2\theta$ error range is $\pm0.2$ degrees. Its x-ray powder diffraction data were shown in Table 3.

TABLE 3

XRPD pattern details of the crystal form C of L-glufosinate

| Position [2θ (°)] | d spacing [Å] | BG | Relative intensity [%] | Relative area [%] | FWHM |
|---|---|---|---|---|---|
| 9.802 | 9.0161 | 10 | 3.1 | 3.7 | 0.196 |
| 16.018 | 5.5283 | 12 | 30.8 | 33.1 | 0.175 |
| 16.620 | 5.3297 | 15 | 7.3 | 6.5 | 0.147 |
| 17.460 | 5.0749 | 13 | 17.5 | 12.0 | 0.112 |
| 18.139 | 4.8867 | 12 | 4.3 | 3.2 | 0.119 |
| 19.067 | 4.6507 | 14 | 100 | 100 | 0.163 |
| 19.338 | 4.5862 | 12 | 45.6 | 78.9 | 0.282 |
| 19.834 | 4.4726 | 16 | 5.2 | 3.5 | 0.109 |
| 20.600 | 4.3081 | 12 | 4.5 | 4.5 | 0.163 |
| 21.581 | 4.1143 | 10 | 33.1 | 31.7 | 0.156 |
| 21.984 | 4.0399 | 12 | 1.7 | 1.8 | 0.177 |
| 23.723 | 3.7474 | 11 | 4.9 | 7.1 | 0.237 |
| 25.439 | 3.4984 | 13 | 3.8 | 5.1 | 0.217 |
| 25.738 | 3.4585 | 14 | 2.8 | 2.6 | 0.152 |
| 26.758 | 3.3289 | 12 | 2.3 | 3.6 | 0.253 |
| 27.082 | 3.2898 | 11 | 2.2 | 1.7 | 0.130 |
| 28.395 | 3.1406 | 12 | 2.5 | 4.0 | 0.263 |
| 29.159 | 3.0600 | 13 | 13.2 | 10.6 | 0.130 |
| 30.983 | 2.8839 | 11 | 5.3 | 5.8 | 0.176 |
| 32.584 | 2.7458 | 13 | 5.9 | 5.4 | 0.147 |
| 33.100 | 2.7041 | 11 | 3.8 | 3.4 | 0.144 |
| 34.242 | 2.6165 | 14 | 6.9 | 8.7 | 0.206 |
| 34.477 | 2.5992 | 15 | 8.4 | 9.3 | 0.180 |
| 35.280 | 2.5419 | 15 | 7.7 | 7.3 | 0.156 |
| 36.768 | 2.4423 | 11 | 2.7 | 6.7 | 0.407 |
| 37.075 | 2.4228 | 13 | 2.2 | 5.6 | 0.422 |
| 39.535 | 2.2775 | 12 | 2.8 | 2.4 | 0.141 |

Figure 6:
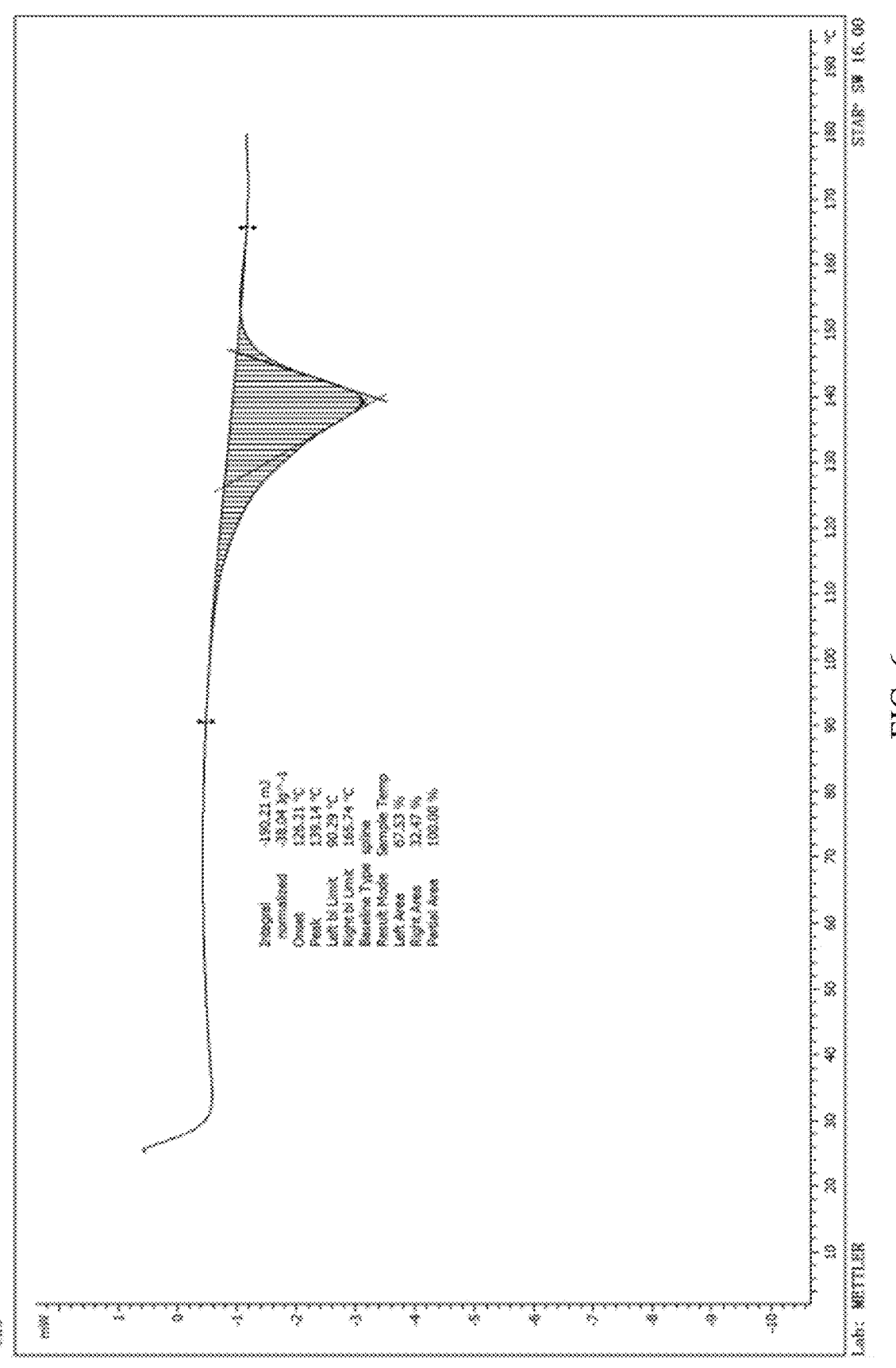
FIG. 6 shows the DSC spectrum of the crystal form C of L-glufosinate prepared in Embodiment 3.

The DSC results (FIG. 6) showed that there was an absorption peak at $139.14°$ C. (peak temperature); using the standard sample without crystal water for quantification, the content was 99%, and the ion chromatography analysis showed that the ammonium content was 0.12%, indicating that the crystal form C of L-glufosinate is a zwitterionic crystal form without crystal water.

Embodiment 4: Preparation of Crystal Form D of L-Glufosinate Ammonium

L-glufosinate ammonium (100 g, 0.48 mol, amorphous) was added to methanol (300 g), the system was heated to $68°$ C., and the temperature was held for 10 h, the system was cooled down to $25°$ C. at a cooling rate of Tj–Tr=–1K, the temperature was held for 24 h, and solid was separated out, filtered, and dried to give the crystal form D of L-glufosinate ammonium.

Figure 7:
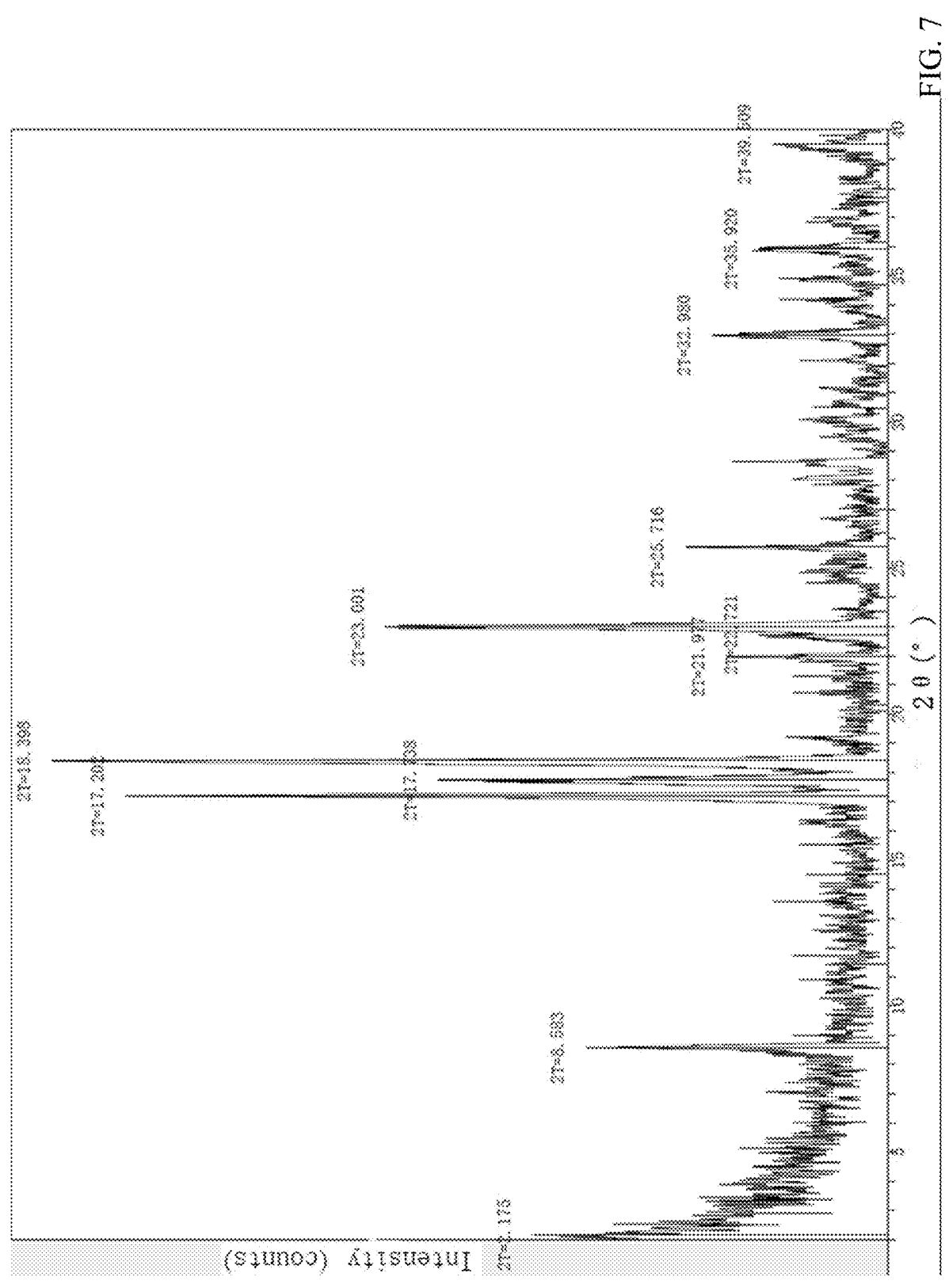
FIG. 7 shows the XRPD pattern of the crystal form D of L-glufosinate ammonium prepared in Embodiment 4.

XRPD test was performed on the obtained crystal form, and the pattern was shown in FIG. 7, there were characteristic peaks at diffraction angles $2\theta=8.583°$, $17.202°$, $18.398°$, and $23.001°$, and the $2\theta$ error range was $\pm0.2$ degrees, confirming the existence of the new crystal form. Its x-ray powder diffraction data were shown in Table 4.

TABLE 4

XRPD pattern

| Position [2θ (°)] | d spacing [Å] | BG | Relative intensity [%] | Relative area [%] | FWHM |
|---|---|---|---|---|---|
| 8.583 | 10.2935 | 10 | 29.7 | 24.8 | 0.135 |
| 17.202 | 5.1507 | 10 | 88.1 | 70.3 | 0.129 |
| 17.738 | 4.9960 | 5 | 52.5 | 82.7 | 0.255 |
| 18.398 | 4.8184 | 7 | 100 | 100 | 0.162 |
| 21.977 | 4.0411 | 3 | 17.8 | 13.2 | 0.12 |
| 22.721 | 3.9104 | 3 | 13.6 | 34.4 | 0.410 |
| 23.001 | 3.8634 | 2 | 61.9 | 86.9 | 0.227 |
| 25.716 | 3.4613 | 4 | 22 | 13 | 0.095 |
| 32.980 | 2.7137 | 3 | 19.5 | 20.6 | 0.171 |
| 35.920 | 2.4981 | 4 | 12.7 | 16.1 | 0.205 |
| 39.509 | 2.2790 | 2 | 12.7 | 21.0 | 0.267 |

Based on the standard sample without crystal water, the quantitative content was 99.01%, and the ammonium content by ion chromatography was 9.03%, which is basically the same as expected from the theoretical monoammonium salt (9.1%). This crystal is an anhydrous form.

It was found from the DSC curve that there were two endothermic peaks, the onset temperatures of the two endothermic peaks were $161.84°$ C. and $199.46°$ C., respectively, the peak temperatures of the two endothermic peaks were $179.83°$ C. and $218.80°$ C., respectively, and absorption of a large amount of heat occurred at $139.5°$ C., indicating that when compared with other crystal forms, this crystal form is not easy to remove the ammonium group, and has better stability. It could be seen from the TGA spectrum that the weight of the crystal was basically unchanged below $139.5°$ C., and started to decrease slowly from $139.5°$ C., which is due to the heat absorption caused by the release of ammonia gas, and decreased rapidly from $206.5°$ C., which may have undergone phase transition and decomposition.

Embodiment 5: Preparation of Crystal Form E of L-Glufosinate Ammonium

L-glufosinate ammonium (100 g, 0.48 mol, amorphous) was added to a mixed solution of water (40 g) and methanol (300 g), the system was heated to $68°$ C., and the temperature was held for 10 h, then the system was cooled down to $50°$ C. at a cooling rate of Tj–Tr=–1K and the temperature was held for 1 h, then the system was cooled down to $25°$ C. at a cooling rate of Tj–Tr=–1K and the temperature was held for 24 h, then solid was separated out, filtered, and dried to give the crystal form E of L-glufosinate ammonium.

Figure 10:
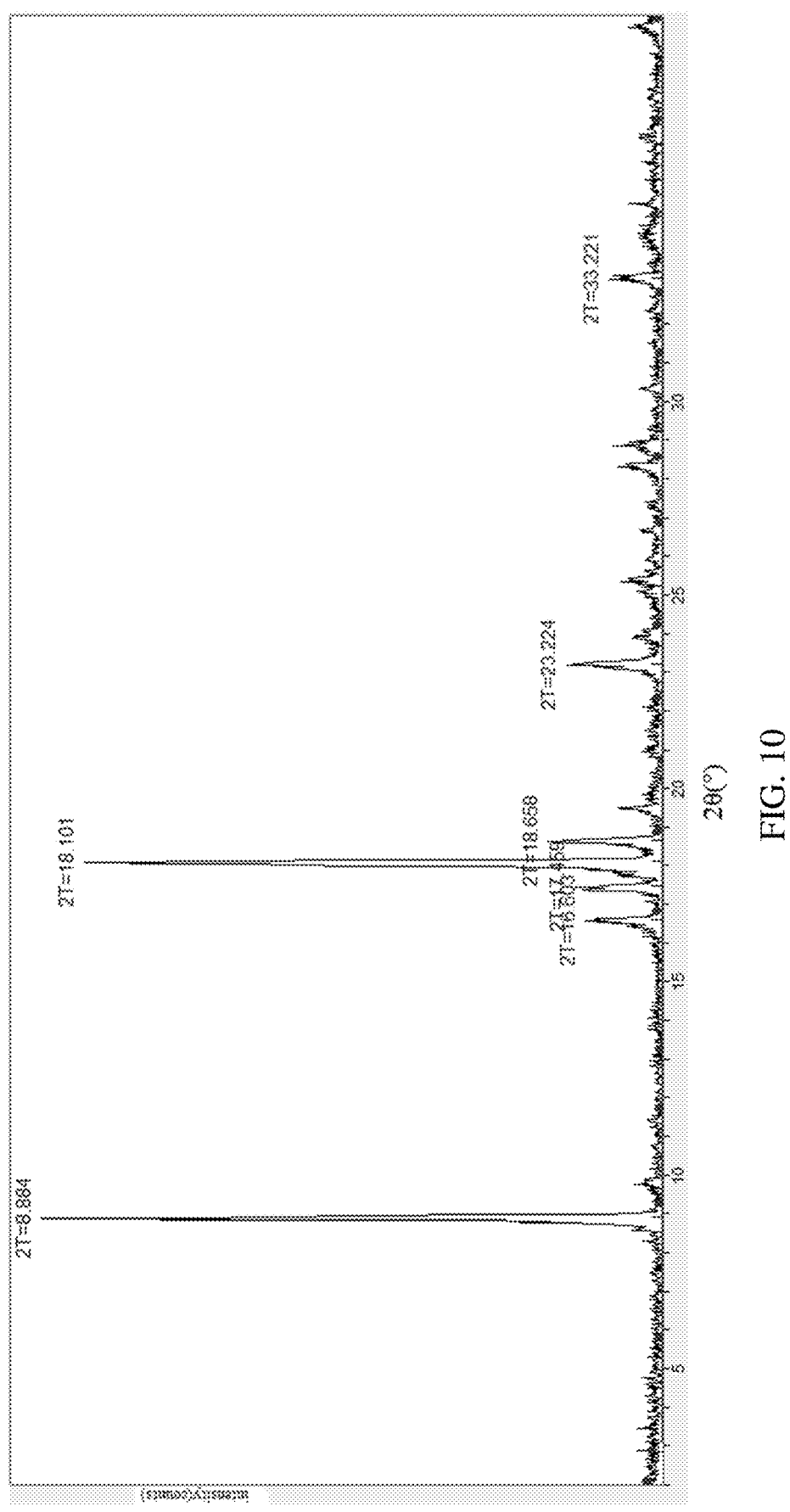
FIG. 10 shows the XRPD pattern of the crystal form E of L-glufosinate ammonium prepared in Embodiment 5.
Figure 11:
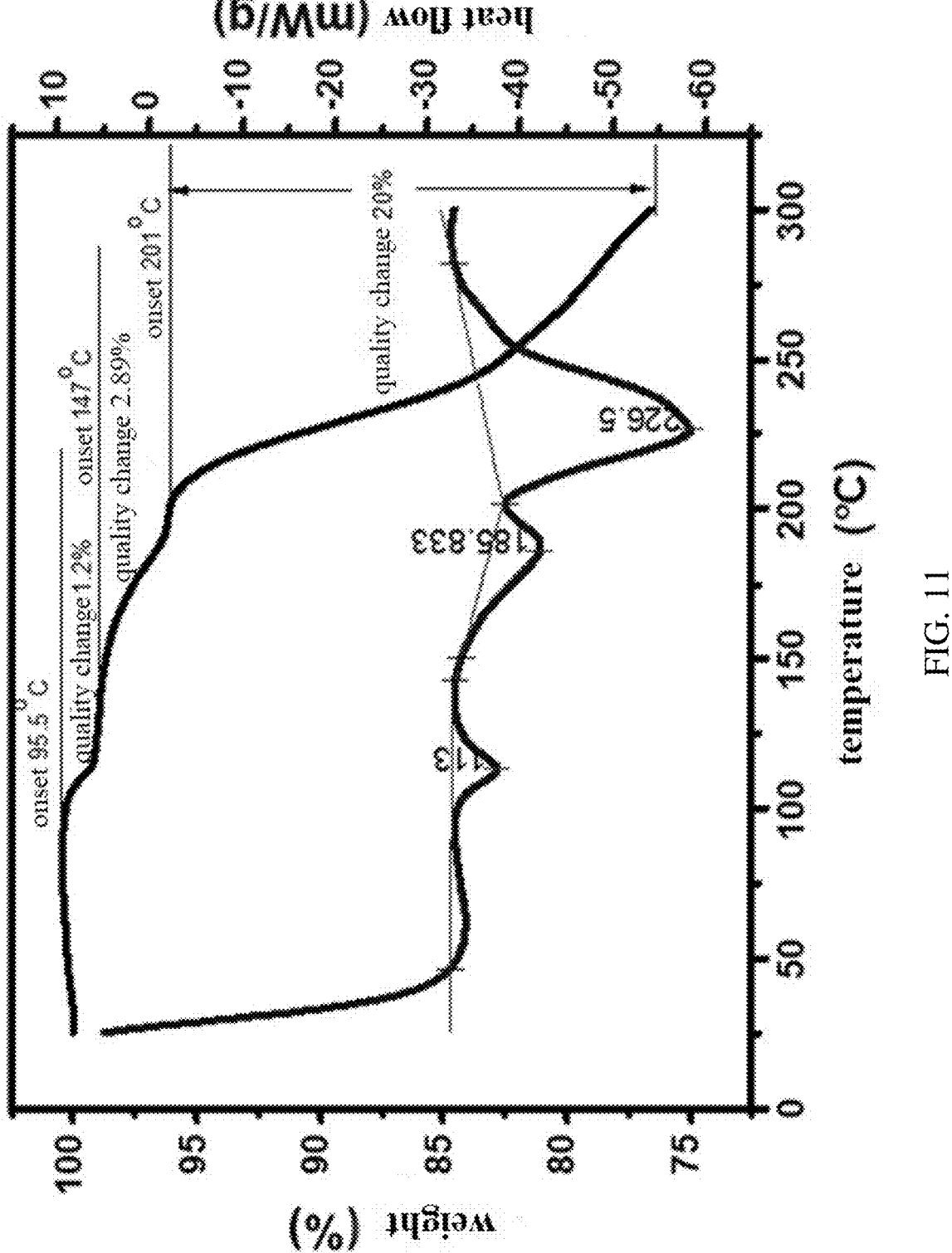
FIG. 11 shows the DSC-TGA combined spectrum of the crystal form E of L-glufosinate ammonium prepared in Embodiment 5.

XRPD test was performed on the obtained crystal form, and the pattern was shown in FIG. 10, there were characteristic peaks at diffraction angles $2\theta=8.884°$, $16.603°$, $17.459°$, $18.101°$, $18.658°$, and $23.224°$, and the $2\theta$ error range was $\pm0.2$ degrees, confirming the existence of the new crystal form. Its x-ray powder diffraction data were shown in Table 5.

TABLE 5

XRPD pattern

| Position [2θ (°)] | d spacing [Å] | BG | Relative intensity [%] | Relative area [%] | FWHM |
|---|---|---|---|---|---|
| 8.884 | 9.9453 | 3 | 100.0 | 1219 | 0.090 |
| 16.603 | 5.3349 | 2 | 11.4 | 222 | 0.145 |
| 17.459 | 5.0752 | 3 | 12.7 | 191 | 0.112 |
| 18.101 | 4.8967 | 3 | 93.0 | 1668 | 0.133 |
| 18.658 | 4.7519 | 3 | 17.0 | 279 | 0.122 |

TABLE 5-continued

| XRPD pattern | | | | | |
| --- | --- | --- | --- | --- | --- |
| Position [2θ (°)] | d spacing [Å] | BG | Relative intensity [%] | Relative area [%] | FWHM |
| 19.513 | 4.5454 | 2 | 6.9 | 86 | 0.104 |
| 23.224 | 3.8268 | 2 | 14.4 | 285 | 0.147 |
| 33.221 | 2.6946 | 2 | 7.4 | 100 | 0.100 |

Based on the standard sample without crystal water, the quantitative content was 97%, and the ammonium content by ion chromatography was 8.81%, which is basically the same as expected from the theoretical monoammonium salt (8.82%). This crystal is an anhydrous form.

It was found from the DSC curve that there were three endothermic peaks, the onset temperatures of the three endothermic peaks were 95.5±2° C., 147±2° C., and 201±2° C., respectively; the peak temperatures of the three endothermic peaks were 113±2° C., 185.8±2° C., and 226.5±2° C., respectively. Absorption of a small amount of heat occurred at about 95.5° C. and 147° C., and absorption of a large amount of heat occurred at 201° C., indicating that this crystal form is not easy to remove the ammonium group, and has better stability. It could be seen from the TGA spectrum that the weight of the crystal was basically unchanged below 95.5° C., started to decrease slowly by 1.2%, which may be due to the influence of a small amount of impurities, and started to decrease slowly from 147° C., which is due to the heat absorption caused by the release of ammonia gas, and decreased rapidly from 226.5° C., which may have undergone decomposition.

For the crystal form A, crystal form B, crystal form D and crystal form E of L-glufosinate ammonium, the data comparison of its high temperature stability were shown in Table 6.

TABLE 6

| Comparison of DSC Heat Absorption and Decomposition Temperatures | | | |
| --- | --- | --- | --- |
| Serial No. | Crystal form | Start of heat absorption | Peak |
| 1 | Crystal form A of L-glufosinate ammonium | 110° C. | 129° C. |
| 2 | Crystal form B of L-glufosinate ammonium | 125° C. | 134° C. |
| 3 | Crystal form in CN113831364A | 104° C. | 115° C. |
| 4 | Crystal form D of L-glufosinate ammonium | 161.84° C. | 179.83° C. |
| 5 | Crystal form E of L-glufosinate ammonium | 147° C. | 185.833° C. |

Experiments show that the new crystal forms A, B, D and E of L-glufosinate ammonium have better high temperature stability than the ammonium salt crystal forms in the existing patent.

Embodiment 6: Preparation of Crystal Form D of L-Glufosinate Ammonium

L-glufosinate ammonium (100 g, 0.48 mol, the crystal form A of Embodiment 1) was added to methanol (300 g), the system was heated to 68° C., and the temperature was held for 10 h, the system was cooled down to 35° C. at a cooling rate of Tj−Tr=−1K, the temperature was held for 24 h, and solid was separated out, filtered, and dried to give the crystal form D of L-glufosinate ammonium.

XRPD test was also performed on the obtained solid, and the test pattern was substantially the same as depicted in FIG. 7, indicating that the obtained solid is the crystal form D of L-glufosinate ammonium.

Embodiment 7: Preparation of Crystal Form D of L-Glufosinate Ammonium

L-glufosinate ammonium (100 g, 0.48 mol, the crystal form B of Embodiment 2) was added to methanol (300 g), the system was heated to 68° C., and the temperature was held for 12 h, the system was cooled down to 25° C. at a cooling rate of Tj−Tr=−1K, the temperature was held for 24 h, and solid was separated out, filtered, and dried to give the crystal form D of L-glufosinate ammonium.

XRPD test was also performed on the obtained solid, and the test pattern was substantially the same as depicted in FIG. 7, indicating that the obtained solid is the crystal form D of L-glufosinate ammonium.

Embodiment 8: Preparation of Crystal Form E of L-Glufosinate Ammonium

L-glufosinate ammonium (100 g, 0.48 mol, the crystal form A of Embodiment 1) was added to a mixed solution of water (40 g) and methanol (300 g), the system was heated to 68° C., and the temperature was held for 10 h, then the system was cooled down to 50° C. at a cooling rate of Tj−Tr=−1K and the temperature was held for 1 h, then the system was cooled down to 25° C. at a cooling rate of Tj−Tr=−1K and the temperature was held for 24 h, then solid was separated out, filtered, and dried to give the crystal form E of L-glufosinate ammonium.

XRPD test was also performed on the obtained solid, and the test pattern was substantially the same as depicted in FIG. 10, indicating that the obtained solid is the crystal form E of L-glufosinate ammonium.

Embodiment 9: Preparation of Crystal Form E of L-Glufosinate Ammonium

L-glufosinate ammonium (100 g, 0.48 mol, the crystal form B of Embodiment 2) was added to a mixed solution of water (40 g) and methanol (300 g), the system was heated to 68° C., and the temperature was held for 10 h, then the system was cooled down to 50° C. at a cooling rate of Tj−Tr=−1K and the temperature was held for 1 h, then the system was cooled down to 25° C. at a cooling rate of Tj−Tr=−1K and the temperature was held for 24 h, then solid was separated out, filtered, and dried to give the crystal form E of L-glufosinate ammonium.

XRPD test was also performed on the obtained solid, and the test pattern was substantially the same as depicted in FIG. 10, indicating that the obtained solid is the crystal form E of L-glufosinate ammonium.

Comparative Example

L-glufosinate hydrochloride (100 g, 0.46 mol) was added to water (200 g), ammonia gas was introduced to adjust the pH=7, the solution was concentrated under reduced pressure to 85%, methanol (600 g) was added at 60° C., and the solution was cooled down rapidly to 20° C. using ice water, and the temperature was held for 7 days, to give a crystal form of L-glufosinate, which was verified to be the crystal form A in the patent CN1110625270A, and after filtration, it had obvious water absorption phenomenon after being placed for 2 days, and it absorbed water and became an aqueous solution.

Embodiment 10: Hygroscopicity Test

Experimental scheme: 100 g of solids were placed under different humidity for 48 h, and re-measured whether there was a significant change in their quality, and visually inspected whether there was a significant change in their appearance, so as to determine whether the crystal form had hygroscopicity, and the specific results of the crystal forms A, B, and C were shown in Table 7, and the specific results of the crystal forms D and E were shown in Table 8.

TABLE 7

| Serial No. | Crystal form | Weight | Appearance | Storage temperature | Humidity | Weight change (%) |
|---|---|---|---|---|---|---|
| 1 | A | 100.00 g | White solid | 20° C. | 65% | +0.02 |
| 2 | B | 100.00 g | White solid | 20° C. | 65% | +0.03 |
| 3 | C | 100.00 g | White solid | 20° C. | 65% | +0.02 |
| 4 | A | 100.00 g | White solid | 20° C. | 80% | +1.45 |
| 5 | B | 100.00 g | White solid | 20° C. | 80% | +1.55 |
| 6 | C | 100.00 g | White solid | 20° C. | 80% | +1.54 |

TABLE 8

| Serial No. | Crystal form | Weight | Appearance | Storage temperature | Humidity | Weight change (%) | Appearance change |
|---|---|---|---|---|---|---|---|
| 1 | Embodiment 4 | 100.00 g | White powder | 25° C. | 65% | +0.03 | Unchanged |
| 2 | Embodiment 5 | 100.00 g | White powder | 25° C. | 65% | +0.02 | Unchanged |
| 3 | Embodiment 6 | 100.00 g | White powder | 25° C. | 65% | +0.03 | Unchanged |
| 4 | Embodiment 7 | 100.00 g | White powder | 25° C. | 65% | +0.01 | Unchanged |
| 5 | Embodiment 8 | 100.00 g | White powder | 25° C. | 65% | +0.02 | Unchanged |
| 6 | Embodiment 9 | 100.00 g | White powder | 25° C. | 65% | +0.02 | Unchanged |
| 7 | Embodiment 4 | 100.00 g | White powder | 25° C. | 80% | +1.12 | Unchanged |
| 8 | Embodiment 5 | 100.00 g | White powder | 25° C. | 80% | +1.23 | Unchanged |
| 9 | Embodiment 6 | 100.00 g | White powder | 25° C. | 80% | +1.17 | Unchanged |
| 10 | Embodiment 7 | 100.00 g | White powder | 25° C. | 80% | +1.12 | Unchanged |
| 11 | Embodiment 8 | 100.00 g | White powder | 25° C. | 80% | +1.15 | Unchanged |
| 12 | Embodiment 9 | 100.00 g | White powder | 25° C. | 80% | +1.18 | Unchanged |

Experiments show that under the condition of low relative humidity, each crystal form has no obvious hygroscopicity. Under the condition of high relative humidity, each crystal form has very low hygroscopicity.

Embodiment 11: Stability Test

Experimental method: The crystal forms A, B, and C were stored at a temperature of 60° C. for 7 days, the crystal form changes were re-measured, and the specific results were shown in Table 9.

TABLE 9

| Serial No. | Crystal form | Weight | Temperature | Humidity | Crystal form | Appearance |
|---|---|---|---|---|---|---|
| 1 | A | 100 g | 60° C. | 65% | Unchanged | Unchanged |
| 2 | B | 100 g | 60° C. | 65% | Unchanged | Unchanged |
| 3 | C | 100 g | 60° C. | 65% | Unchanged | Unchanged |

Experiments show that compared with the crystal forms in CN111065270A, the crystal forms A, B and C of L-glufosinate have excellent stability and are very beneficial to packaging and transportation.

The crystals obtained in Embodiments 4-9 were stored for 48 days at 25° C. and 60° C., respectively, the crystal form changes were re-measured, and the specific results were shown in Table 10.

TABLE 10

| Serial No. | Crystal form | Weight | Temperature | Humidity | Crystal form | Appearance | Weight change (%) |
|---|---|---|---|---|---|---|---|
| 1 | Embodiment 4 | 100 g | 25° C. | 65% | Unchanged | Unchanged | +0.03 |
| 2 | Embodiment 5 | 100 g | 25° C. | 65% | Unchanged | Unchanged | +0.02 |
| 3 | Embodiment 6 | 100 g | 25° C. | 65% | Unchanged | Unchanged | +0.03 |
| 4 | Embodiment 7 | 100 g | 25° C. | 65% | Unchanged | Unchanged | +0.01 |
| 5 | Embodiment 8 | 100 g | 25° C. | 65% | Unchanged | Unchanged | +0.02 |
| 6 | Embodiment 9 | 100 g | 25° C. | 65% | Unchanged | Unchanged | +0.02 |
| 7 | Embodiment 4 | 100 g | 60° C. | 65% | Unchanged | Unchanged | +0.02 |
| 8 | Embodiment 5 | 100 g | 60° C. | 65% | Unchanged | Unchanged | +0.01 |
| 9 | Embodiment 6 | 100 g | 60° C. | 65% | Unchanged | Unchanged | +0.02 |
| 10 | Embodiment 7 | 100 g | 60° C. | 65% | Unchanged | Unchanged | +0.01 |
| 11 | Embodiment 8 | 100 g | 60° C. | 65% | Unchanged | Unchanged | +0.02 |
| 12 | Embodiment 9 | 100 g | 60° C. | 65% | Unchanged | Unchanged | +0.02 |

Experiments show that crystal forms D and E have excellent storage stability at 25° C. and 60° C.

Embodiment 12: Formulation Preparation and Field Efficacy Experiment

The present disclosure is described in further detail below in conjunction with specific formulation preparation and field efficacy experiments, and the protected crystal forms of this patent meets the requirements of water preparations, and can also be developed into formulations such as single formulation and compound formulation. The following percentages are by weight.

The combination of preparation processing and field efficacy test was adopted below. The test chemicals were provided by Jiangsu Sevencontinent Green Chemical Co., Ltd., and the formula is shown in Table 11 below.

TABLE 11

| Glufosinate 10% aqueous solution | |
|---|---|
| Material name | Formula ratio |
| Glufosinate (crystal of L-glufosinate ammonium) | 10% |

TABLE 11-continued

| Glufosinate 10% aqueous solution | |
|---|---|
| Material name | Formula ratio |
| Surfactant | 3% |
| Water | Supplement |

The above-mentioned formulations were prepared with the crystals of the embodiments of the present disclosure and the crystal form A in the patent CN111065270A respectively for field efficacy experiments. It was detected that the physical and chemical properties of the aqueous solution products prepared by each crystal form were stable and met the needs of production and use, and at the same time, field experiments were carried out on different weeds. The dosage was 120 mL/mu.

Referring to the "Pesticide-Guidelines for the field efficacy trials", 5 sites were investigated in each plot, each site was 1 square meter, and the types of weeds, the total number of plants, the symptoms of poisoning, the number of dead plants, etc. were recorded for each treatment 7 days after the treatment, and then the results of the plant control effect were counted, and the weed mortality was calculated and counted specifically.

$$\text{Weed morality (\%)} = \frac{\text{Number of dead plants treated}}{\text{Total number of plants treated}} \times 100\%$$

TABLE 12

| | | | Investigation results of plant control effect 7 days after treatment | | | |
|---|---|---|---|---|---|---|
| | | Preparation | | Plant control effect (%) | | |
| Treatment | Agent | dosage (mL/mu) | Rumex | Alopecurus aequalis | Euphorbia helioscopia | Bluegrass |
| 1 | Crystal form A of Embodiment 1 of the present disclosure | 120 | 100 | 80 | 80 | 80 |
| 2 | Crystal form B of Embodiment 2 of the present disclosure | 120 | 100 | 85 | 80 | 80 |
| 3 | Crystal form A in CN111065270A | 120 | 95 | 80 | 75 | 75 |

TABLE 12-continued

| | | | Investigation results of plant control effect 7 days after treatment | | | |
|---|---|---|---|---|---|---|
| | | Preparation | | Plant control effect (%) | | |
| Treatment | Agent | dosage (mL/mu) | Rumex | *Alopecurus aequalis* | *Euphorbia helioscopia* | Bluegrass |
| 4 | Crystal form D of Embodiment 4 of the present disclosure | 120 | 100 | 86 | 85 | 85 |
| 5 | Crystal form E of Embodiment 5 of the present disclosure | 120 | 100 | 85 | 90 | 85 |

Conclusions

Compared with the crystal form A in the patent CN1110625270, the efficacy of the ammonium salt crystal forms A and B in this patent is obviously 5 to 10% higher. It is speculated that the single ammonium salt crystal form is conducive to the absorption of plants, thereby achieve the effect of weeding.

Compared with other crystal forms of the ammonium salt, the efficacy of the crystal forms D and E of the ammonium salt in this patent is obviously about 5% higher.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

The endpoints and any values of the ranges disclosed herein are not limited to the precise ranges or values, and these ranges or values should be understood to include values close to these ranges or values. For ranges of value, between the end values of each range, between the end values of each range and individual point values, and between individual point values can be combined with each other to obtain one or more new ranges of value, and these ranges of value should be considered as specifically disclosed herein.

The invention claimed is:

1. A crystal of L-glufosinate, wherein the crystal of L-glufosinate is a crystal form D, the crystal form D is ammonium salt forms of L-glufosinate, and the crystal form D has an X-ray powder diffraction pattern with characteristic peaks at 2θ of 8.583°±0.2°, 17.202°±0.2°, 17.738°±0.2°, 18.398°±0.2°, 21.977°±0.2°, 22.721°±0.2°, 23.001°±0.2°, and 25.716°±0.2°.

2. The crystal of L-glufosinate according to claim 1, wherein:

the X-ray powder diffraction pattern of the crystal form D further has one or more characteristic peaks at 2θ of 32.980°±0.2°, 35.920°±0.2°, and 39.509°±0.2°.

3. The crystal of L-glufosinate according to claim 1, wherein:

the X-ray powder diffraction pattern of the crystal form D has characteristic peaks at 2θ of 8.583°±0.2°, 17.202°±0.2°, 17.738°±0.2°, 18.398°±0.2°, 21.977°±0.2°, 22.721°±0.2°, 23.001°±0.2°, 25.716°±0.2°, 32.980°±0.2°, 35.920°±0.2°, and 39.509°±0.2°.

4. The crystal of L-glufosinate according to claim 1, wherein:

the X-ray powder diffraction pattern of the crystal form D is as depicted in FIG. 7.

5. The crystal of L-glufosinate according to claim 1, wherein:

a spectrum of the crystal form D determined by differential scanning calorimetry shows two endothermic peaks, onset temperatures of the two endothermic peaks are 161.84±2° C. and 199.46±2° C., respectively, and a spectrum of the crystal form D determined by thermogravimetric analysis shows that a weight loss of 4.3±0.2% occurs when heated from 139.5±2° C. to 206.5±2° C.

Figure 8:
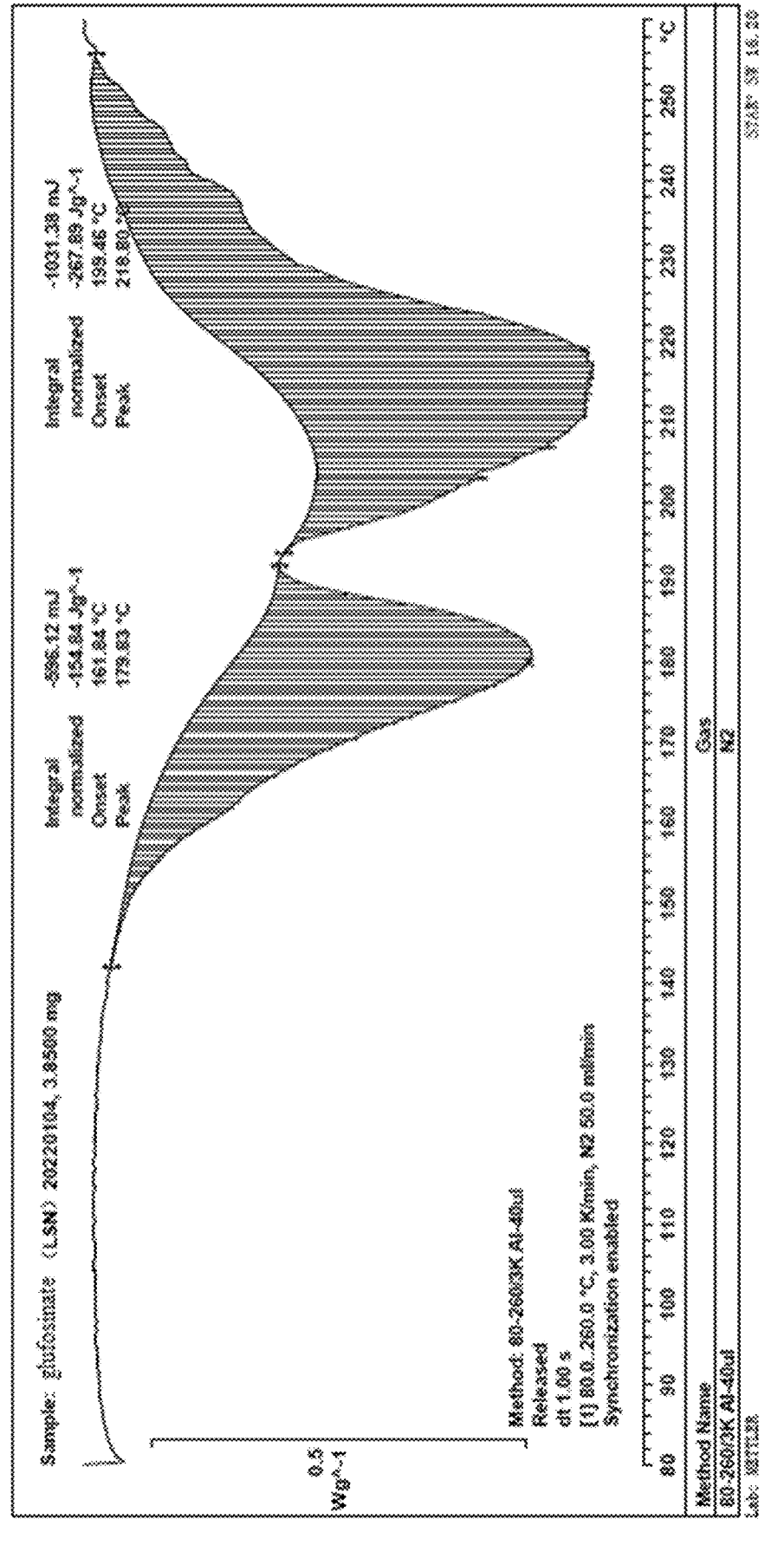
FIG. 8 shows the DSC spectrum of the crystal form D of L-glufosinate ammonium prepared in Embodiment 4.
Figure 9:
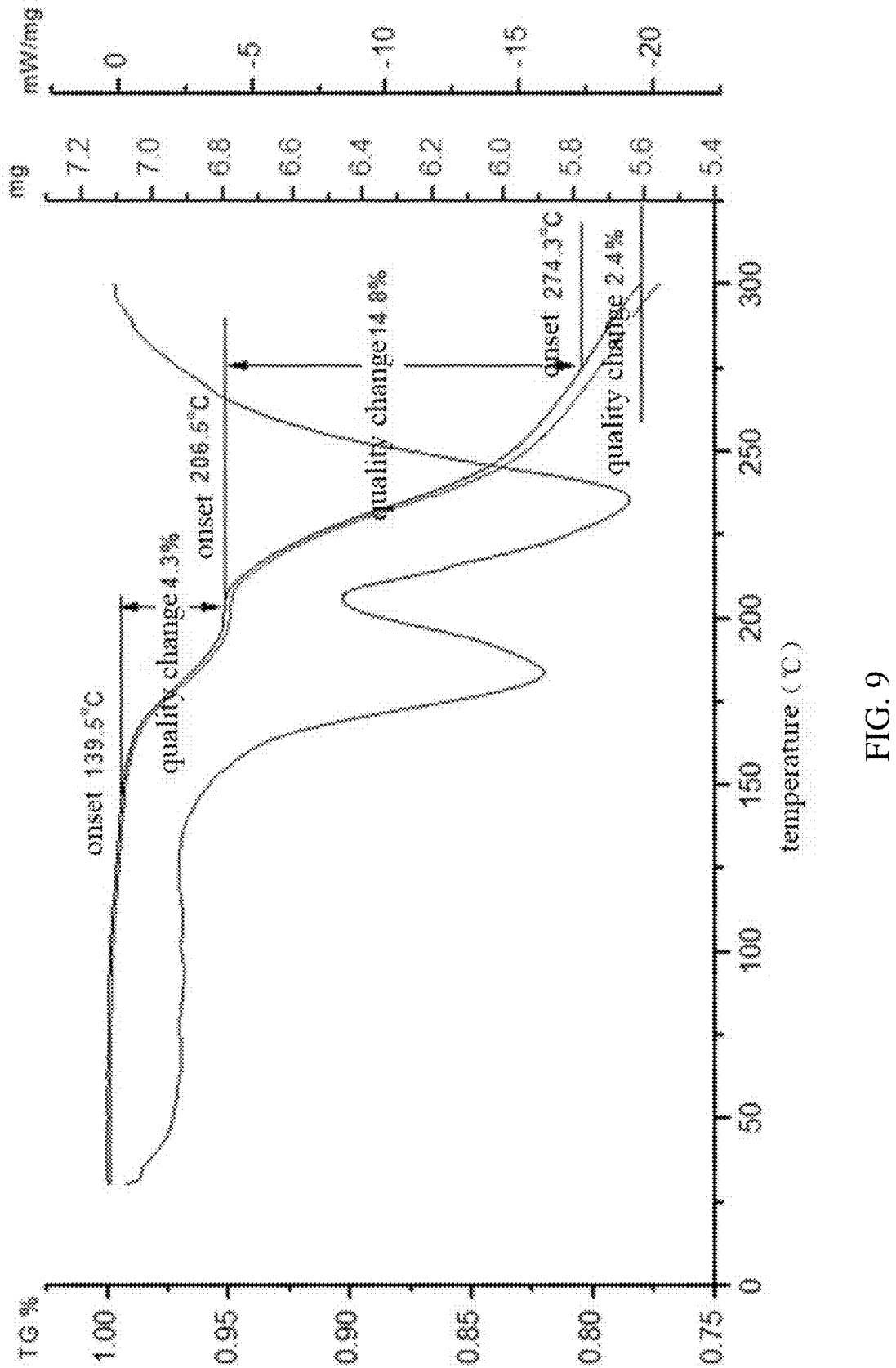
FIG. 9 shows the DSC-TGA combined spectrum of the crystal form D of L-glufosinate ammonium prepared in Embodiment 4.

6. The crystal of L-glufosinate according to claim 1, wherein:

a spectrum of the crystal form D determined by differential scanning calorimetry is as depicted in FIG. 8, and a combined spectrum of the crystal form D determined by differential scanning calorimetry and thermogravimetric analysis is as depicted in FIG. 9.

7. The crystal of L-glufosinate according to claim 1, wherein:

the crystal form D is an anhydrous form.

8. A preparation method of a crystal of L-glufosinate according to claim 1, comprising:

adding L-glufosinate ammonium to an organic solvent;

heating to 65-90° C. and holding a temperature for a first time, then cooling down to 15 to 35° C. at a cooling rate of 1K between an external temperature and an internal temperature;

holding the temperature for a second time, precipitating a solid, filtering to obtain the solid; and drying the solid obtained to give the crystal form D of L-glufosinate, wherein the organic solvent is methanol.

9. The preparation method of the crystal of L-glufosinate according to claim 8, wherein:

a feeding mass ratio of L-glufosinate ammonium to the organic solvent is 1:(1-20).

10. The preparation method of the crystal of L-glufosinate according to claim 9, wherein:

the feeding mass ratio of L-glufosinate ammonium to the organic solvent is 1:(1-10).

11. The preparation method of the crystal of L-glufosinate according to claim 8, wherein:

in the process of preparing the crystal form D of L-glufosinate, the holding temperature of the first time of temperature holding is 65-80° C., and a holding time of the first time of temperature holding is 1-15 h, and a holding time of the second time of temperature holding is 1 h-7 days.

12. An herbicide composition comprising an active ingredient and a carrier, wherein the active ingredient comprises the crystal form D of L-glufosinate according to claim 1 in crystal form.

* * * * *